(12) United States Patent
Valery et al.

(10) Patent No.: US 8,216,475 B2
(45) Date of Patent: Jul. 10, 2012

(54) PROCESS AND DEVICE FOR SEPARATING FRACTIONS OF A MIXTURE

(75) Inventors: Eric Valery, Pulnoy (FR); Céline Morey, Nancy (FR)

(73) Assignee: Novasep, Pompey (FR)

( * ) Notice: Subject to any disclaimer, the term of this patent is extended or adjusted under 35 U.S.C. 154(b) by 975 days.

(21) Appl. No.: 12/281,170

(22) PCT Filed: Mar. 7, 2007

(86) PCT No.: PCT/FR2007/000406
§ 371 (c)(1),
(2), (4) Date: Aug. 29, 2008

(87) PCT Pub. No.: WO2007/101944
PCT Pub. Date: Sep. 13, 2007

(65) Prior Publication Data
US 2011/0000853 A1   Jan. 6, 2011

(30) Foreign Application Priority Data
Mar. 8, 2006   (FR) ...................................... 06 02076

(51) Int. Cl.
*B01D 15/08* (2006.01)
(52) U.S. Cl. .................................... 210/659; 210/198.2
(58) Field of Classification Search .................. 210/635, 210/656, 659, 198.2
See application file for complete search history.

(56) References Cited

U.S. PATENT DOCUMENTS

| 3,268,605 | A | * | 8/1966 | Boyd, Jr. ....................... 585/821 |
| 4,182,633 | A | | 1/1980 | Ishikawa et al. |
| 5,457,260 | A | | 10/1995 | Holt |
| 5,569,808 | A | | 10/1996 | Cansell et al. |
| 5,902,486 | A | | 5/1999 | Couenne et al. |
| 6,217,774 | B1 | * | 4/2001 | Nagamatsu et al. .......... 210/659 |
| 2002/0174769 | A1 | | 11/2002 | Adam et al. |
| 2005/0107895 | A1 | | 5/2005 | Pistikopoulos et al. |
| 2006/0124549 | A1 | | 6/2006 | Bailly et al. |
| 2009/0209736 | A1 | * | 8/2009 | Theoleyre et al. ............ 530/413 |
| 2011/0098940 | A1 | * | 4/2011 | Ito et al. ......................... 702/32 |

FOREIGN PATENT DOCUMENTS

| DE | 19842550 A1 | 3/2000 |
| EP | 0878222 B1 | 3/2004 |
| FR | 2846252 A1 | 4/2004 |
| FR | 2889077 A1 | 2/2007 |
| WO | 9851391 A1 | 11/1998 |
| WO | 9957089 A1 | 11/1999 |

* cited by examiner

*Primary Examiner* — Ernest G Therkorn
(74) *Attorney, Agent, or Firm* — Marsh Fischmann & Breyfogle LLP

(57) ABSTRACT

The invention concerns a method for separating fractions of a mixture using a chromatography device. The method includes the following steps: controlling in one node of the device, the history of a specific variable of the fractions of the mixture to be separated; detecting one characteristic point of the history, the characteristic point being between two successive steps of fraction collecting; comparing the position of the characteristic point relative to a target position; adjusting the amount of mobile phase modifying the position of the characteristic point to cause the position of the characteristic point to coincide with the target position. The invention also concerns a device for implementing the method. The method enables the operation of the device to be automatically set.

16 Claims, 29 Drawing Sheets

PROCESS AND DEVICE FOR SEPARATING FRACTIONS OF A MIXTURE

REFERENCE TO RELATED APPLICATIONS

This application is a 371 of PCT/FR2007/000406 filed Mar. 7, 2007.

The present invention relates to a process and a device for separating fractions of a mixture by chromatography.

Chromatography is a separation method based on the difference in distribution of the products of a mixture between a mobile phase (eluent or solvent) and a stationary phase. The products are separated by percolating a liquid, gaseous or supercritical fluid into a device (a column) filled with solid or liquid stationary phase.

This method is used as an analysis technique in order to identify and quantify the products of a mixture. It can also be used as a separation or purification technique.

According to requirements, different chromatographic methods are used to carry out the purification of molecules. Some of these are described in the publication by P. C. Wankat, Large Scale Adsorption and Chromatography, CRC Press, Boca-Raton, 1986, in the publication by M. D. Le Van, G. Carta, C. Yon, Perry's Handbook Eng., Ed. 7, MacGraw-Hill, N-1, 1997, or in the publication of R. M. Nicoud and M. Bailly, Choice and optimization of operating mode in industrial chromatography, Proceedings of the 9th International Symposium on preparative and industrial chromatography, PREP 92, April 1992, Nancy, pp. 205-220.

These processes can be classified according to various criteria, in particular depending on whether the process is continuous or discontinuous. The processes are applied in devices having one or more columns, wherein the composition of the eluent can be isocratic or a gradient can be used.

Methods for adjusting the parameters of chromatography processes are at least as numerous as the processes themselves. Several methods for automatic regulation or monitoring of chromatography systems have been published.

Document FR 2 699 917 (U.S. Pat. No. 5,569,808) of the Institut Français du Pétrole describes a method for regulating a process for separating at least one aromatic hydrocarbon isomer having 8 to 10 carbon atoms, contained in a mixture comprising at least two of said isomers, said process comprising a separation stage in suitable conditions in a separation zone. Said method comprises the steps a) simultaneous transmission in at least two suitable points of said zone, other than effluents sampling points, of a monochromatic light signal of a wavelength of between 400 and 1300 nanometres and preferably between 420 and 650 nanometres; b) retrieval of a polychromatic scattered signal corresponding to the Raman effect between 400 and 3500 $cm^{-1}$, and preferably between 600 and 1200 $cm^{-1}$, substantially at said points; c) simultaneous transmission of at least the two retrieved signals to a multi-channel spectrometer delivering the corresponding Raman spectra; d) determination from the two spectra of the chemical composition of the mixture at each of the two points; e) repetition of the sequence of steps a, b, c and d so as to reconstitute the concentration profiles of the two isomers contained in the mixture, and f) comparison of the obtained concentration profiles with reference concentration profiles and action on at least one operating variable of the separation process in order to regulate it.

The article "Optimal operation of simulated moving bed chromatographic processes by means of simple feedback control" by H. Schramm, S. Grüner, A. Kienle, Journal of Chromatography A, 1006 (2003), 3-13 describes two methods for controlling an SMB or Simulated Moving Bed device.

According to a first interference control method, the device is equipped with UV sensors, each of the sensors being arranged in a separation zone. The UV profile is recorded as the sum of the concentrations of the components in the device. In particular, four different separation fronts can be observed in the concentrations as well as in the UV profile. From the difference between the measured signals and recorded set points, PI controllers calculate flow rate ratios m for each of the separation zones. Flow rates in each of the zones are then calculated to control the simulated moving bed device. An individual regulation of the four separation zones is thus obtained. The set points are for example such that the fronts of the concentration profiles are situated at the middle of the different separation zones. The authors explain that the interference control is to be activated when the system is stabilized and the purities of the drawn-off fractions are satisfactory.

Because interference control is insufficient to adjust the purities, the document describes a second control method based on the knowledge of a model. In contrast to interference control, control on the basis of a model requires more than a UV profile, and access to the concentrations is required via a status monitor. The model makes it possible to calculate by simulation the best operating conditions to satisfy the constraints on purities of the output products. The model is then readjusted according to the purities results obtained during the separation. The limitation of this process resides in the accuracy of the status monitor, making it possible to work back from the UV profile to the concentration profile, and in the knowledge of the separation profile, which needs to be determined beforehand as precisely as possible.

Document U.S. Pat. No. 5,457,260 describes a method for continuously controlling at least one characteristic of an SMB or simulated moving bed process. The simulated moving bed is realized using a rotary valve, making it possible to shift the injection of feed and eluent and shift the drawing-off of the extract and raffinate over an operating cycle. The controlled features can be the purity or the yield of the component of interest. The process comprises the steps of (a) determination of the concentration of at least one component in the circulating fluid, in a minimum of three positions of the valve within one valve cycle (b) determination of the current value of the feature using all of the concentrations determined within a valve cycle; (c) adjustment of the duration of rotation of the valve and flow rates according to an algorithm; (d) repetition of the steps a) to c) until the difference between the current value of the feature and a desired value is below a threshold.

The drawback is that there is a long implementation time, since the result is obtained only after numerous tests, and it can be exploited only within the field of the tests carried out. This method also has limited precision, that of modelling of non-linearities in general.

Document US-A-2005 107895 describes a regulation process using Model Predictive Control (MPC). An approximate model of the process makes it possible to predict the future development of the system from concentration measurements of the output products. According to the envisaged development of the system, and the physical parameters of the latter, an optimizer selects the operating parameters to be applied in order to achieve the specifications set for the output products. Once the specifications are achieved, the operating parameters are adjusted again in order to improve the process performances.

The process requires a complex algorithm as well as a model representing the separation.

Document FR-A-2 762 793 (U.S. Pat. No. 5,902,486) describes a process for the control of a simulated moving bed system (or unit) for separating constituents, comprising a closed loop constituted by the interconnection in series of beds containing adsorbent solid material, distributed over several zones delimited by injection points and collection points for fluids, means of injecting fluids into the loop, means of extracting fluids from the loop, means of permutation of the injection and collection points, making it possible to simulate counter current shifting of the beds, and means of measuring various variables (such as concentrations, flow rates, the period of permutation of the valves, etc.).

The process comprises (a) measuring operating variables such as the flow rates or the period and the measurement of concentrations of certain constituents required for the calculation of variables ordered at a number of points of the separation loop at least equal to two; (b) determining, from current values of the measured variables, and using a non-linear model of the operation of the separation system, ratios (Rk) indicative respectively of the ratio in each of the different zones, between the flow rates of fluids (QK) and the simulated flow rates of adsorbent material (Qs) so as to return the ordered variables (such as the purity or the yield) upward or downward to the determined set points; and (c) determining from these ratios (Rk), the values to be given to the operating variables (flow rates or period).

This process also has the drawback of using a separation model.

Document DE-A-198 42 550 describes a method for optimizing a simulated moving bed-type chromatography process for estimating separation parameters. In this process, measurements are taken on each of the outlet lines in order to determine a feature such as the concentration. Using these measurements and a mathematical algorithm, the physical behaviour of the system is determined.

A need therefore exists for a separation process which is simpler and quicker to implement and which does not require a separation model.

For this, the invention proposes a process for separating fractions of a mixture to be separated in a chromatography device having:
  one or more columns in a loop, a circulating mobile phase displacing the fractions of the mixture to be separated in said loop,
  injection points for mixture and eluent,
  collection points for fractions,
  sequencing elements for injection and collection points,
  the process comprising the stages of fraction collections, mixture injection between two successive collections in the period where the fractions of the mixture leave the column(s) and are sent to the next inlet, the process also comprising the steps of:
  in a node of the device, monitoring the history of a specific variable of the fractions of the mixture to be separated,
  detecting a characteristic point of the history, the characteristic point being between two successive fraction collection steps,
  comparing the position of the characteristic point with a target position,
  adjusting the quantity of the mobile phase, modifying the position of the characteristic point to make the position of the characteristic point coincide with the target position.

According to a variant, the device comprises at least one chromatography column and collection points where the fractions are collected, one of the fractions, the extract, is more retained in the column than the other fraction, the raffinate, which is less retained in the column.

According to a variant, the device comprises injection points for the mixture and eluent and collection points for fractions, sequencing elements for the injection and collection points, the process comprising the sequencing of the injection and collection points up to their original position in the device at the end of an operating cycle.

According to a variant, the history is monitored over one operating cycle of the device.

According to a variant, the history is monitored over less than one cycle, until the appearance of the characteristic point of the history.

According to a variant, the history is monitored at a frequency corresponding to a whole number of cycles of operation of the device.

According to a variant, the history is monitored in a single node.

According to a variant, a single characteristic point is detected between two successive collections, the period of each collection being included, integrating the mixture injection to be processed.

According to a variant, during the adjustment step, the quantity of mobile phase is modified by varying the average flow rate of mobile phase.

According to a variant, the device operates cyclically, and during the adjustment step, the quantity of mobile phase is modified by varying the cycle time.

According to a variant, the process also comprises the steps of: —measuring the purity of at least one collected fraction, —comparing the measured purity with a predetermined purity, the process also comprising a step of defining the target point according to the difference between the measured purity and the predetermined purity.

According to a variant, the process also comprises the steps of —measuring the purity of at least two collected fractions, —comparing the measured purity of the fractions with respectively a predetermined purity, the process also comprising a step of defining the target position according to the difference between the measured purities and the predetermined purities.

According to a variant, during the step of defining the target position, the target position is defined following a modification of the position of the mixture injection on the history.

According to a variant, the process also comprises the steps of: —measuring the purity of at least one collected fraction, —comparing the measured purity with a predetermined purity, the process also comprising a step of modifying the quantity of mixture injected according to the difference between the measured purity and the predetermined purity.

According to a variant, the process also comprises the steps of —measuring the purity of at least two collected fractions, —comparing the measured purity of the fractions with respectively a predetermined purity, the process also comprising a step of modifying the quantity of injected mixture according to the difference between the measured purities and the predetermined purities.

According to a variant, the quantity of mixture is increased if the measured purities are higher than the predetermined purities.

According to a variant, the quantity of mixture is reduced if the measured purities are lower than the predetermined purities.

According to a variant, the process also comprises steps of —in a node of the device, monitoring the history of a specific variable of the fractions of the mixture to be separated, —detecting a second characteristic point of the history, dedicated to the adsorption or the collection of a less retained fraction of the mixture, situated between the step of drawing off or collecting less retained fraction and the eluent injection step; —comparing the position of the characteristic point with a target position, —adjusting the quantity of mobile phase modifying the position of the characteristic point to make the position of the characteristic point coincide with the target position.

According to a variant, the device comprises a zone at the entrance to which a less retained fraction is drawn off and at the exit from which the eluent is injected, the process comprising, at the adjustment step, adjustment of the average flow rate in this zone, in order to make the position of the characteristic point coincide with the target position.

According to a variant, during the adjustment step, the duration of the step of collection of the least retained fraction is modified to make the position of the characteristic point coincide with the target position.

According to a variant, the process also comprises steps of —in a node of the device, monitoring the history of a specific variable of the fractions of the mixture to be separated, —detecting a third characteristic point of the history, dedicated to the desorption or the collection of a more retained fraction of the mixture, situated between the eluent injection step and the step of collecting or drawing-off the more retained fraction; —comparing the position of the characteristic point with a target position; —adjusting the quantity of the mobile phase modifying the position of the characteristic point in order to make the position of the characteristic point coincide with the target position.

According to a variant, the device comprises a zone at the entrance to which eluent is injected and at the exit from which a more retained fraction is drawn off, the process comprising, at the adjustment step, adjustment of the average flow rate in this zone to make the position of the characteristic point coincide with the target position.

According to a variant, during the adjustment step, the duration of the step of collecting the most retained fraction is modified in order to make the position of the characteristic point coincide with the target position.

According to a variant, the observation nodes are chosen at different locations or at the same locations.

According to a variant, the histories are different or are the same.

According to a variant, the specific variables are different or are the same.

According to a variant, the monitoring is carried out at a node other than at a point where fractions are collected.

According to a variant, the characteristic point is chosen from the group consisting of an inflection point of the history, a threshold of the history, an extremum of the history, a zero value, a defined gradient of the history.

According to a variant, the specific variable is chosen from the group consisting of rotatory power, adsorption of spectroscopic radiation, emission of spectroscopic radiation, density, refractive index, conductivity, pH.

According to a variant, during the adjustment step, the adjustment of mobile phase volume is carried out by adjustment of the collection flow rate of a fraction.

According to a variant, the mixture injection is continuous.

According to a variant, the device comprises several columns connected in series.

According to a variant, the chromatographic device is suitable for the VariCol process, or the simulated moving bed process.

According to a variant, the device comprises a zone at the entrance to which a fraction is drawn off and at the exit from which the mixture to be separated is injected, the process comprising, at the adjustment step, the adjustment of the average flow rate of this zone in order to make the position of the characteristic point coincide with the target position.

According to a variant, the mixture injection is discontinuous.

According to a variant, the device comprises one or two columns.

According to a variant, the device is suitable for the CycloJet process.

According to a variant, the process is automatic.

The invention also relates to a device for separating a fraction of a mixture by chromatography comprising the implementation of the above process.

According to a variant, the chromatography device comprises —a command logic suitable for implementing the above process.

According to a variant, the device comprises detectors situated on the recycling line.

According to a variant, the device comprises remote detectors. According to a variant, the device comprises an analytical device, the purity of the fractions being measured by the analytical device.

The invention also relates to the use of the above process for the separation and/or purification of mixtures of interest.

The invention also relates to the use of the above process for the separation and/or the purification of enantiomers.

The invention also relates to the use of the above process for the separation and/or the purification of molecules.

The invention also relates to the use of the above process for the separation and/or the purification of proteins.

The invention also relates to the use of the above process for the separation and/or the purification of antibodies.

The invention also relates to the use of the above process for the separation and/or the purification of pharmaceutical compounds.

BRIEF DESCRIPTION OF THE DRAWINGS

Other features and advantages of the invention will appear on reading the following detailed description of the embodiments of the invention, given solely by way of example and with reference to the drawings which show.

DESCRIPTION OF THE PREFERRED EMBODIMENTS

Figure 1:
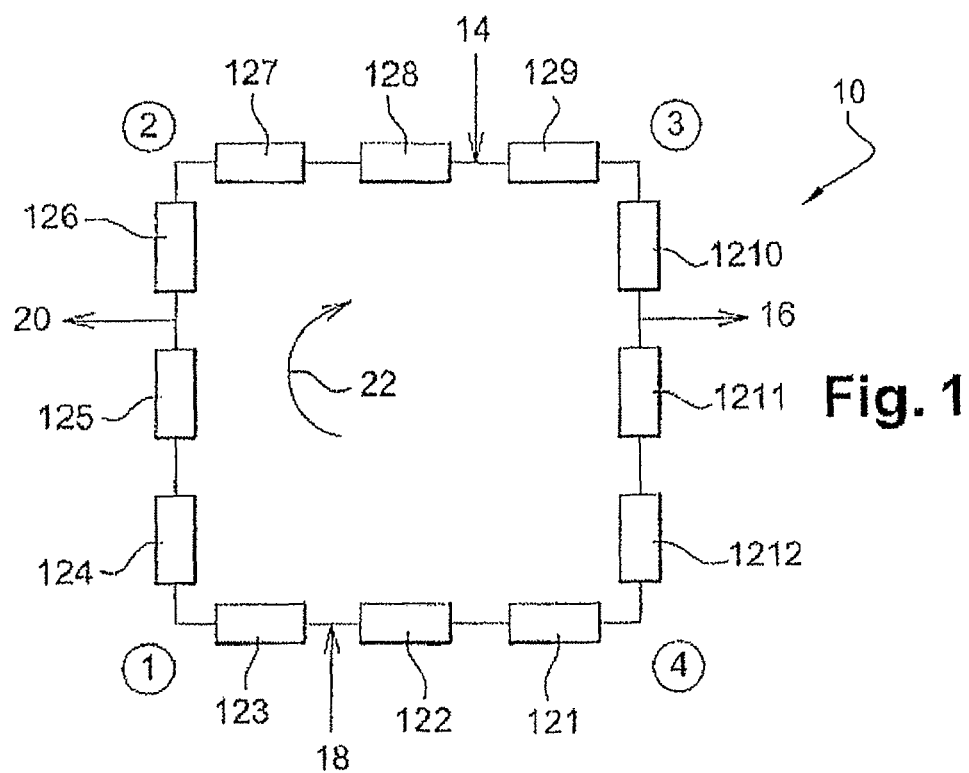
FIG. 1, a representation of a simulated moving bed device.

The invention relates to a process for separating fractions of a mixture to be separated, in a chromatography device. The device has one or more chromatography columns in a loop; a mobile phase circulates in the device and shifts the fractions of the mixture to be separated. The process comprises stages of collecting fractions and injecting mixture; the mixture injection takes place between two successive collections of a less retained product or set of products and a more retained product or set of products, whilst the fractions of the mixture in the course of separation leave the column(s) and are sent to the next column intake.

The mode of collection of the fractions can be carried out in a different fashion, more precisely, the term drawing-off will be used when a partial sampling of mobile phase is performed at the outlet of the column, the remainder being injected into the following column, and the term total collection will be used when the whole of the mobile phase flow rate leaving a column is collected.

The process also comprises a step of monitoring, in a node of the device, the history of a specific variable of the fractions of the mixture to be separated. The process also comprises a step of detecting a characteristic point of the history, preferably over the period of time delimited by the start of the collection of a less retained fraction and the end of the following collection of a more retained fraction close to the node. The process then comprises a step of comparison of the position of the characteristic point with a target position, then a step of adjusting the quantity of mobile phase, modifying the position of the characteristic point in order to make the position of the characteristic point coincide with the target position.

The invention makes it possible to simplify the process of separation of the fractions, as the process can be adapted to the variations in the conditions of implementation of a separation by chromatography; in particular, the process does not require the reconstitution of an operating model of the device. The process makes it possible to automatically monitor and adjust the operation of the separation device. The process makes it possible to react rapidly to any disturbance on a device which is stable or in the course of stabilization.

By way of an example of a device, the simulated moving bed ("SMB", the term SMB will be used hereafter, the VariCol device or the CycloJet device) can be mentioned.

The chromatographic columns can contain stationary, liquid or solid phases, which are eluted by a fluid in gaseous, liquid or even supercritical state. The process is applied to devices comprising at least one chromatography column filled with a stationary phase and comprising points for injection of a mixture of at least two species and of eluent at the entrance to the column and fractions collection points; the devices also include means for sequencing the injection and collection points. In particular, the sequencing of these injection and collection points takes place over one operating cycle of the device. Hereafter, a "cyclical operation" or "cycle" denotes the time at the end of which the injection and collection points have been sequenced until returning to the initial position in the device. At the end of a cycle, the device is once again in its initial configuration. A cycle comprises as many periods as there are columns in the separation loop, thus the cycle of an 8-column SMB or VariCol device will be made up of 8 periods. In the case of a CycloJet with one column, the cycle is composed of a single period; cycle time and period are then treated the same.

FIG. 1 shows a device 10 allowing a four-zone SMB process to be implemented. The device 10 comprises a set of chromatographic columns or sections of chromatographic columns containing a stationary or adsorbent phase, the columns being assembled in series and in a closed loop. The columns have an inlet and an outlet, the outlet of a column being connected to a following column inlet. By way of example, twelve columns 121 to 1212 are represented. The loop contains at least one point 14 for the injection of mixture (feed), a collection point 16 of fraction rich in products little retained by the stationary phase (fraction called raffinate), a point 18 for the injection of an eluent and a point 20 for the collection of fraction rich in products less retained by the stationary phase (fraction called extract). The injection point 14 of mixture is between columns 128 and 129, the collection point of raffinate 16 is between columns 1210 and 1211, the injection point 18 of eluent is between columns 122 and 123 and the collection point 20 of extract is between columns 125 and 126.

The device operates by synchronous sequencing, i.e. by synchronous shifting of the set of injection and collection points of a column or column section in a direction 22 defined in relation to the direction of flow of a principal fluid circulating though the loop. The shifting of the set of points of a column or column section corresponds to a period; at the end of a cycle all the points have returned to their initial position, the device operating cyclically. A cycle comprises as many periods as there are columns or column sections.

The VariCol process differs from the SMB process in that, during a cycle, the sequencing or shifting of the different injection and collection points of a column or column section is carried out at different times, such that the length of the zones defined by said different points is variable. The sequencing or shifting of the points is asynchronous. At the end of a cycle the set of points have returned to their initial position, the device operating cyclically. A period corresponds to the time at the end of which the set of points have been shifted by one column or column section. A cycle comprises as many periods as there are columns or column sections.

In the devices allowing the SMB and/or VariCol processes to be implemented, it is possible to determine a chromatographic zone between an injection point and an collection point or vice-versa; thus a zone 1 can be defined between the eluent injection point 18 and the extract collection point 20, a zone 2 between the extract collection point 20 and the mixture injection point 14, a zone 3 between the mixture injection point 14 and the raffinate collection point 16 and a zone 4 between the raffinate collection point 16 and the eluent injection point 18. Zones 2 and 3 form a separation zone, zone 1 forms a desorption zone and zone 4 forms an adsorption zone.

The SMB and VariCol processes can be implemented with a configuration having less than four zones, for example three zones (by eliminating zone 4). In this latter case, the device operates in an open loop, all of the fluid coming from zone 3 being collected at the raffinate collection point 16.

Figure 2:
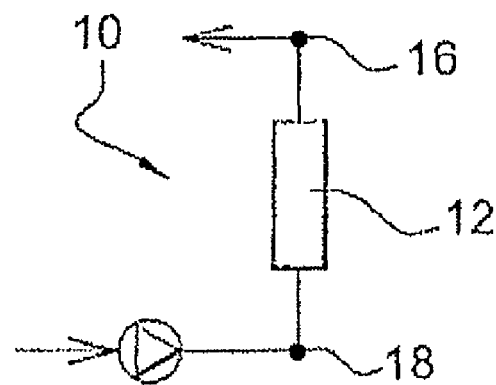
Figure 3:
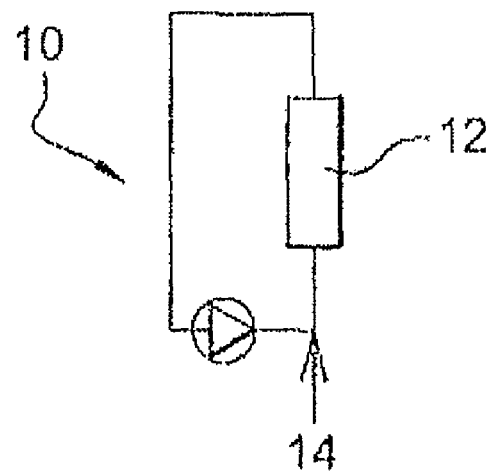
Figure 4:
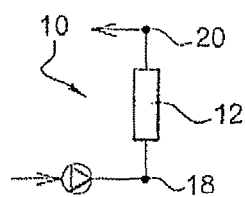

FIGS. 2 to 4 show a device 10 allowing a CycloJet process to be used. This device can comprise a single column; it is described in document EP-A-0 981 399. FIG. 2 shows a chromatography column 12, filled with a stationary phase. The device 10 comprises eluent injection points 18 and total fraction collection points 16. In FIG. 2, the device 10 is in the course of carrying out a stage of total collection of a fraction, for example a fraction rich in product less retained by the stationary phase, also called raffinate. In FIG. 3, a recycling stage is represented, the outlet of the column 12 being connected to the inlet of the column 12; during this stage, a mixture injection takes place at point 14. During this step the column is in a closed loop, the outlet of the column being connected to the following column inlet, in this case, of the same column. The injection point 14 is for example an injection loop; the injection loop is loaded with mixture and the injection is carried out by diverting the fluid at the outlet of the column through the loop before reinjecting the fluid into the column inlet, which makes it possible to insert a volume of mixture into the mixture in the course of separation. FIG. 4 shows a point 20 for the total collection of the fraction. The device 10 is in the course of performing a stage of total collection of another fraction, for example a fraction rich in product more retained by the stationary phase, also called extract.

Thus, between FIGS. 2 and 4, the injection points 14 and 18 have been sequenced; the device comprises alternately the injection of mixture or the injection of eluent at the column inlet. Also, between FIGS. 2 and 4, the collection points 16 and 20 have been sequenced; at the outlet of column 12, the device comprises the raffinate collection point 16, when the raffinate is to be collected, or the device comprises the extract collection point 20, when the extract is to be extracted.

Figure 5:
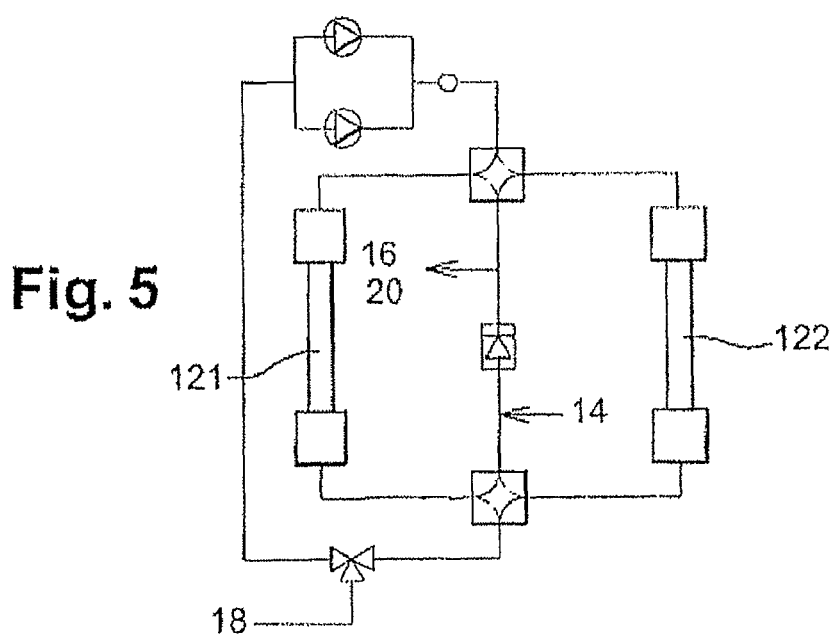
FIGS. 2 to 5, representations of the CycloJet device.

The Cyclojet device can also be applied in two columns; it is described in document EP-A-0 876 936. FIG. 5 shows the two-column Cyclojet device, in which a cyclical preparatory chromatography process is applied, comprising in steady state:
(a) establishing of a chromatographic profile circulating in a figure of eight between two chromatography columns 121 and 122, said chromatographical profile never passing through an elution pump;
(b) discontinuous and periodic injection of a mixture at point 14, comprising at least two fractions, into said circulation profile; and
(c) collection, in discontinuous and periodic manner, of at least two enriched fractions from said circulation profile, at points 16 and 20.

Eluent is injected at point 18. The columns are in a loop, the outlet of one column being connected to the following column inlet.

The principle therefore rests on the use of an external recycling system making it possible to prevent the recycled fraction from passing through the elution pump.

The devices allowing the SMB and VariCol processes to be implemented are continuous injection devices in that the injection of mixture is carried out over the whole of a cycle; three- and two-zone SMB-type devices can also be mentioned. Other devices like the CycloJet are discontinuous injection devices in that the injection is not carried out over the whole of a cycle but for a total duration of less than one cycle; devices can also be mentioned such as SSMB ("Sequential Simulated Moving Bed"), iSMB, Powerfeed (PowerFeed operation of simulated moving bed units: changing flow rates during the switching interval; Ziyang Zhang, Marco Mazzotti, Massimo Morbidelli; Journal of Chromatography A, 1006 (2003) 87-99), ModiCon (Improved operation of simulated moving bed processes through cyclic modulation of feed flow and feed concentration; H. Schramm, A. Kienle, M. Kaspereit, A. Seidel-Morgenstern; Chemical Engineering Science 58 (2003) 5217-5227), a multi-chromatograpic column process with a reconcentration step described in patent FR 2846252 or such as the subject of patent application FR 0507952 filed in France on 26 Jul. 2005.

These devices make it possible to separate the fractions F1, F2, F3 . . . of a mixture (or feed) to be separated. The mixture can be binary, i.e. comprising two compounds; however, the mixture can also contain more than two products.

Moreover, the described devices are characterized by the fact that they are accumulation devices. There is accumulation in a device when the mixture injection is inserted or added to a non-zero concentration profile passing from the outlet to the inlet of a column. The mixture injection takes place when the fractions of the mixture in the course of separation leave the column(s) and are sent to the next column inlet. In the continuous injection devices of the SMB or VariCol type, the mixture injection is carried out continuously between two columns, for example using an injection pump. The injection is in addition to the output from the column before entering the next column. The thus-injected mixture is therefore added to a non-zero concentration profile; thus there is accumulation. In a one-column Cyclojet device, the injection is carried out when the products leaving column 12 are sent to the inlet of this same column 12. A volume of fluid containing the mixture to be separated is then inserted between the column outlet and the inlet. The thus-injected mixture is therefore inserted into a non-zero concentration profile; thus there is accumulation. In the multi-column devices such as for example a two-column CycloJet or such as the subject of patent application FR 0507952 filed in France on 26 Jul. 2005, the injection is carried out when the fractions leaving one column are sent towards the inlet of the next column. It is possible to use an injection pump, injecting into a column when for example, the elution of the previous column is stopped. It is also possible to use an injection loop. In both cases, the mixture thus injected is therefore inserted into a non-zero concentration profile; thus there is accumulation.

By "concentration profile" is meant the state of concentration of the fractions of the fluid flowing in the device, a state considered at a time "t" over the whole of the device. Document FR-2 699 917 (U.S. Pat. No. 5,569,808) mentioned at the beginning of the present description describes steps allowing a concentration profile to be reconstituted. In particular, to reconstitute the concentration profile, at least two sensors are arranged in a separation zone of the device.

A concentration profile is different from a "history" of a specific variable; by "history" is meant the state or development in time of a specific variable of the fractions of the mixture moving in the device, a state which is considered for a duration or a time determined at a particular point of the device. Thus, adopting a position at a particular point of the device, which can be called "observation node", it is possible to monitor a specific variable of the fractions of the mixture to be separated, flowing at the observation node.

The period over which the state of the specific variable is determined is for example one operating cycle. At the end of the cycle, the history can be reinitialized and re-started. The duration can also be shorter, as will be explained below.

The x-axis of a history can be expressed in various units:
uncorrected time: the axis starts at 0 and terminates at the effective end of the cycle time;
the reduced time defined by the uncorrected time divided by the cycle time: in this case, the axis of the history is always between 0 and 1;
an index of the progress in the cycle: this is the generalization of the uncorrected time divided by the cycle time; this is useful where there may be programmed stops in the flow rates of elutions, the duration of which can be variable.

The observation node is a point of the device which can be freely chosen. Preferably, the observation node is a point of the device other than a fraction collection point; the observation node is for example situated between the outlet of the column(s) and the closest fraction collection point. As the devices have a cyclical operation, a point will also preferably be chosen where the passages for the collection of the fractions enriched in one of the fractions follow one another. For example, in a device of the CycloJet type, with one or two columns, the observation node is at the column outlet, before the collection means, since in the processes where the collection is total, there is no liquid passing from one column to the other; in a device of the SMB or VariCol type, the observation node is for example at a point situated between the outlet and the inlet of two successive columns in the device.

The process for regulating the separation processes will now be described. Firstly, the steps of a first routine, which can be called the routine of positioning the characteristic point, will be described. By routine is meant the implementation of a principle of adjustment of the chromatographic device. This implementation can for example be in the form of a software algorithm driving an automaton, more generally, it is a procedure intended to achieve a particular task. In the remainder of the description of the present invention, several independent routines are presented, each with a defined role.

According to a stage of the process, a position is adopted at a node of the device and the history of a specific variable of the fractions of the mixture to be separated in the device is monitored. Thus the state of a specific variable is monitored. During the first routine, the specific variable is not the concentration or the actual purity of the fractions, or in particular is not a value of the concentration or the actual purity of the fractions. This has the advantage of adjusting the operation more rapidly than if a concentration or a purity has to be measured; the speed of adjustment is in particular at the start-up of the process. Moreover, given that it is unnecessary to measure the purity or the concentration, calibration of the detector is not required. Furthermore, the advantage of the first routine is that there is no longer a need to monitor every variation in calibration over time; thus at the end of a certain time, there is no need to stop the process to verify that the calibration is still correct. However, it is unnecessary to produce a history in physical form, for example by displaying or printing the history; monitoring without saving or display is sufficient. Preferably, the monitoring step is carried out at a single node; this makes it possible to limit the use of detectors and avoid the need to consider synchronization of the detectors, the synchronisation moreover being capable of evolving over time, for example in the case of a change in status of one of the columns of the device.

FIGS. 6 to 16 show the monitoring of the history of the concentrations of the fractions of the mixture moving in the device and flowing at the observation node for a continuous and discontinuous injection device for a binary mixture.

FIGS. 6 to 11 show the observation of the concentrations of the fractions of the mixture moving in the device and flowing at the observation node for a device for continuous mixture injection, in particular, for an SMB device. The SMB comprises six columns 121 to 126 as well as points 14, 18 for the mixture injection and eluent and points 16, 20 for the collection of fractions. The raffinate is collected at point 16 and the extract is collected at point 20. On the left-hand side of the figures, the development of the internal concentrations of the device is represented in relation to the columns of the device. It will thus be seen that the concentration profile shifts along the columns, which corresponds to the shifting of the fractions due to the mobile phase; as the columns are in a loop, the profile leaving column 126 reappears in column 121. Thus the term circulating concentration profile is used. On the right-hand side of the figures, a concentrations history is represented; the history is read at an observation node 24 positioned at an outlet of column 126. FIGS. 6 to 11 show an operating cycle of the device, comprising six periods of duration $\Delta T$ (corresponding to six shifts of the injection and collection points). In FIGS. 6 to 11, the x axis of the history corresponds to a reduced time expressed as a number of periods.

Also by way of example, the considered mixture is binary but can also comprise more than two products. It is also stated that the concentration profile is represented only in order to better understand the development of the specific variables monitored at the observation node; it is not a matter of reconstituting the concentration profile.

Figure 6:
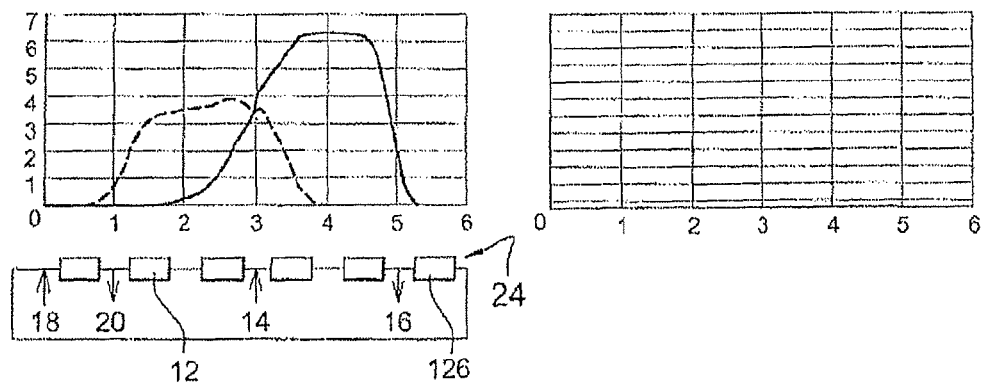
FIGS. 6 to 11, examples of operation and movement of fractions of the mixture to be separated in a continuous injection device.

FIG. 6 is the start of the cycle at $T=\Delta T/2$. On the left-hand side a concentration profile is seen, extending along column 121 to column 126. The curve shown as a solid line represents the concentration status of the least retained product. The curve shown as a dotted line represents the concentration status of the most retained product. At mixture injection point 14, the curves have a step, corresponding to a mixture injection into the concentration profile. It will be noted that this crossing also appears in the following figures, at mixture injection point 14. At the node 24, no concentration is read; the concentration profile has not reached the outlet of column 126.

Figure 7:
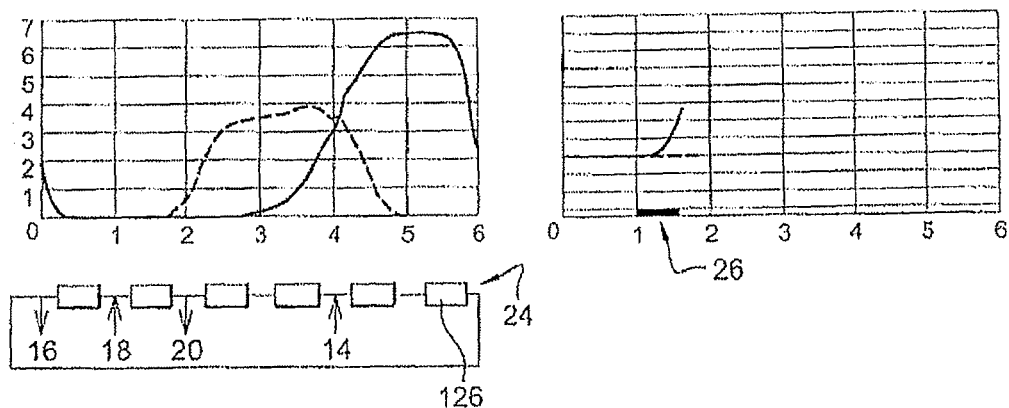

FIG. 7 shows the cycle at $T=\Delta T+\Delta T/2$. On the left-hand side, the concentration profile has progressed along the columns. It is also seen that the set of points 14, 16, 18, 20 have been shifted by one column, which corresponds to a fresh period. At node 24, the concentration profile is such that the concentration of least retained product has increased; the history shows that the concentration of least retained product at node 24 has increased. Moreover, compared with FIG. 6, the collection point 16 for least retained product has been shifted at the outlet of column 126; at node 24 this collection of least retained product is detected, the history indicating this collection by the line numbered 26.

Figure 8:
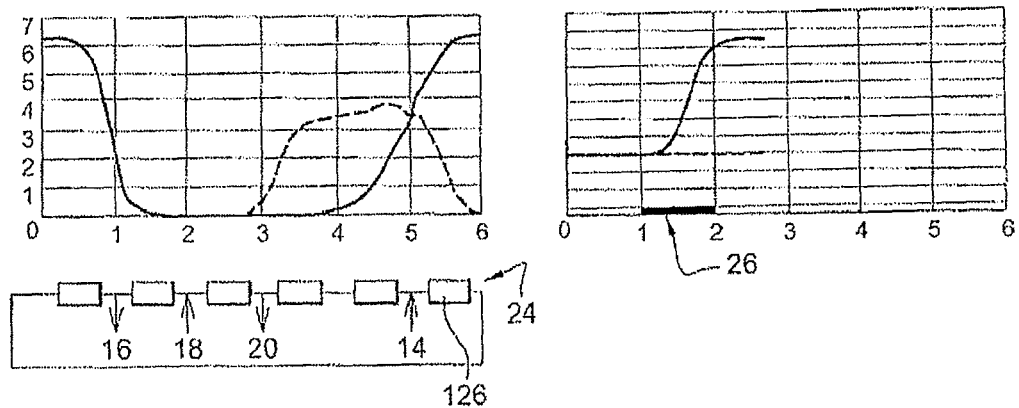

FIG. 8 shows the cycle at $T=2\Delta T+\Delta T/2$. On the left-hand side, the concentration profile has progressed along the columns. It is also seen that the set of points 14, 16, 18, 20 have been shifted by one column, which corresponds to a fresh period. At node 24, the concentration profile is such that the concentration of least retained product has increased, then stabilized; the history shows that the concentration of least retained product at node 24 has increased and stabilized. Moreover, as the collection point 16 for least retained product has been shifted by one column compared with FIG. 7, the collection of least retained product is no longer detected at node 24; on the right-hand side of FIG. 8, the line 26 is broken, showing that the collection of least retained product no longer takes place at the outlet of column 126. The history shows that the concentration of most retained product at node 24 is again zero.

Figure 9:
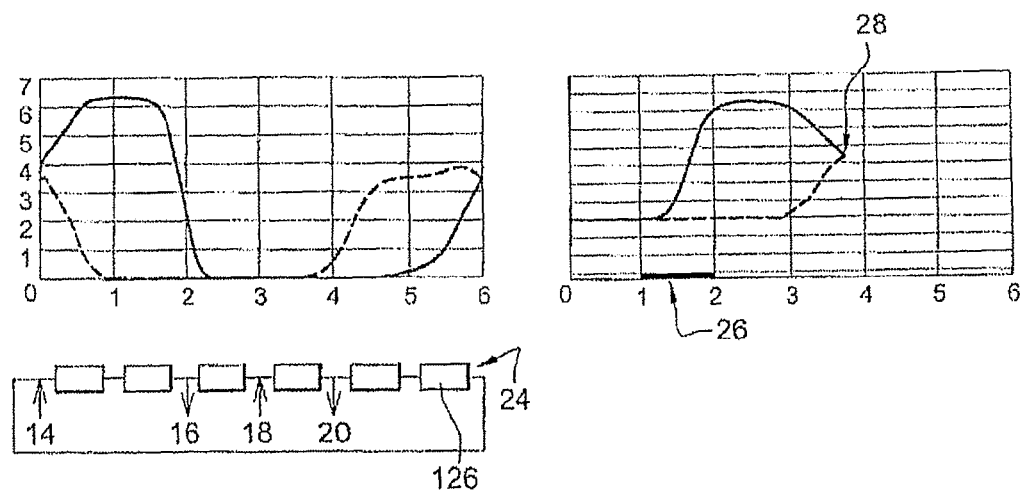

FIG. 9 shows the cycle at $T=3\Delta T+\Delta T/2$. On the left-hand side, the concentration profile has progressed along the columns. It is also seen that the set of points 14, 16, 18, 20 have been shifted by one column, which corresponds to a fresh period. At node 24, the concentration profile is such that the concentration of least retained product has reduced and the concentration of most retained product increases; the history shows that the concentration of least retained product at node 24 reduces and that the concentration of most retained product increases. The development in the concentrations on the history also shows that the concentrations at node 24 pass through a point 28 where the concentrations are equal. Also, FIG. 9 shows that the injection point 14 is at the outlet of column 126 close to node 24.

Figure 10:
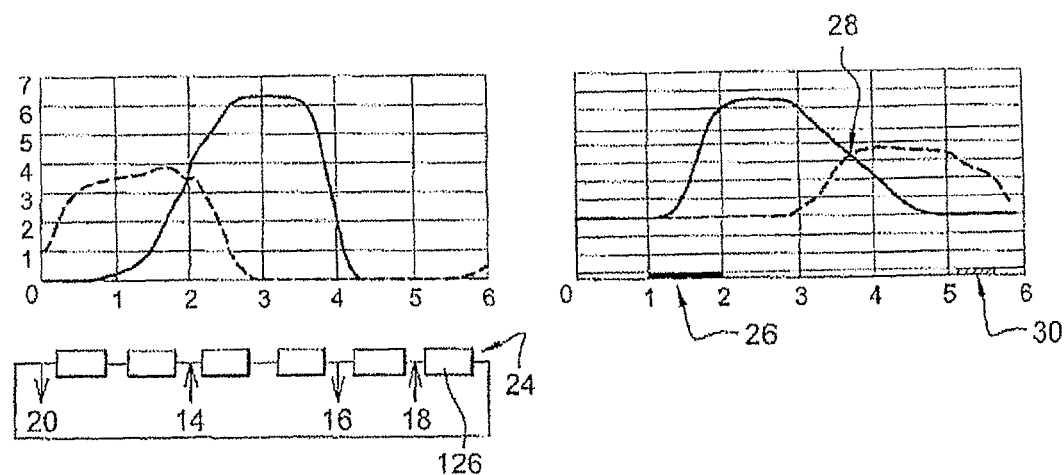

FIG. 10 shows the cycle at $T=5\Delta T+\Delta T/2$, i.e. two periods later than FIG. 9. On the left-hand side, the concentration profile has progressed along the columns. It is also seen that the set of points 14, 16, 18, 20 have been shifted by two columns. At node 24, the concentration profile is such that the concentration of least retained product is zero, and the concentration of most retained product has reduced; the history shows that the concentration of least retained product at node 24 is zero and the concentration of most retained product at node 24 has reduced. Moreover, compared with FIG. 9, the extract collection point 20 has been shifted at the outlet of column 126; at the node 24 this collection of least retained product is detected, the history indicating this collection by the line numbered 30.

Figure 11:
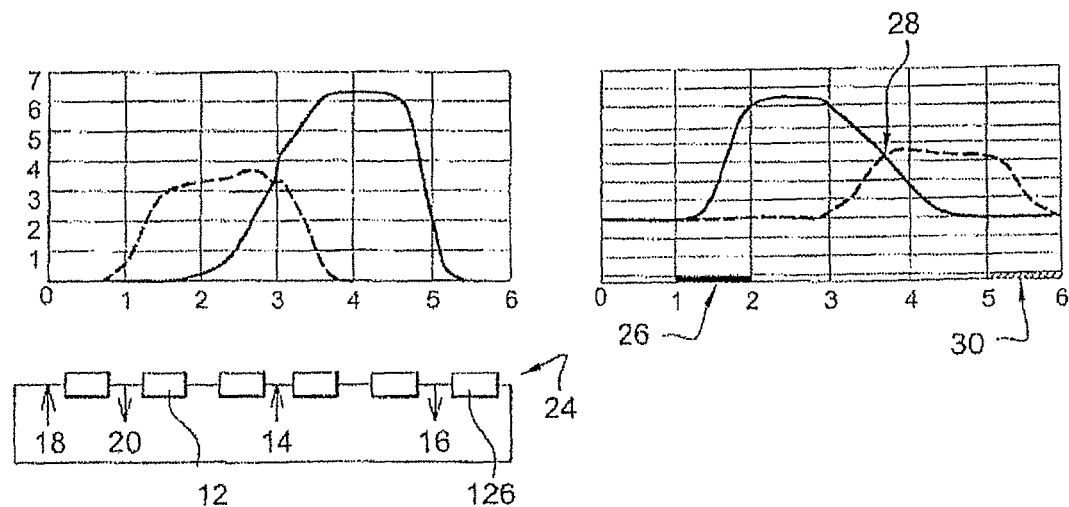

FIG. 11 shows the cycle at T=6ΔT+ΔT/2. i.e. the cycle has ended and a following cycle has started. On the left-hand side, the concentration profile has progressed along the columns. It is also seen that the set of points 14, 16, 18, 20 have been shifted by one column, which corresponds to a fresh period. At node 24, the concentration profile is such that the concentration of each product is zero; the history shows what has been monitored between T=0 and T=6ΔT, it appears that the concentration of the two products is zero at node 24. The collection of most retained product has been detected at node 24 between T=5ΔT and T=6ΔT; on the right-hand side of FIG. 11, the line 30 is broken, and the history has ended; a fresh history corresponding to a fresh cycle will start after T=6ΔT, in the case of this example, the end of the history coincides with the end of the collection of most retained product which is no longer carried out at the outlet of column 126 after T=6ΔT. Finally, in FIG. 11, an operating cycle has ended; the injection and collection points are in the initial position of FIG. 6.

The history of FIG. 11 at the observation node 24 at the outlet of column 126, reveals in the following order:
 a step of collection of a fraction enriched in a less retained product, for example the raffinate;
 a step called accumulation, where the outlet and inlet of the column integrating the observation node are interconnected, with no collection, but with a continuous injection of mixture;
 a step of collection of a fraction enriched in a less retained product, for example the extract.

On the history of FIG. 11, it is noted that point 28 (which will be explained in more detail hereafter) is situated between raffinate and extract collection lines 26 and 30; this shows that this point appears at the observation node 24 whilst the observation node 24 is situated in the separation zone of the device, between the raffinate and extract collection points. As the collection and injection points are shifted by means of sequencing during a cycle, the observation node 24, which is itself fixed, is situated successively in all the separation, adsorption and desorption zones.

It should be noted that the position of node 24 at the outlet of column 126 is an example; if the node were placed in another position, the history would be similar, but temporally shifted.

FIGS. 12 to 16 show the observation of the concentrations of the fractions of the mixture moving in the device and flowing at the observation node for a device for discontinuous mixture injection, in particular for a CycloJet device. The CycloJet comprises a column 12 as well as points 14, 18 for the injection of mixture and eluent, and points of fraction collection 16, 20. The least retained product is collected at point 16, and the most retained product is collected at point 20. On the left-hand side of the figures, the development in the internal concentrations of the device is represented in relation to the column of the device. It will thus be seen that the concentration profile shifts along the column, which corresponds to the shifting of the fractions due to the mobile phase; when the outlet of column 12 is capable of being connected to the inlet of column 12, the profile leaving column 12 reappears at the inlet of column 12. Thus the term circulating concentration profile is used. On the right-hand side of the figures, a history of a specific variable is represented; the history is read at an observation node 24 positioned at the outlet of column 12. FIGS. 12 to 16 show an operating cycle of the device, comprising a period (corresponding to a recycling, injection and collection sequence). In FIGS. 12 to 16, the x-axis of the history corresponds to the uncorrected time of a cycle.

Also by way of example, the considered mixture is binary but can also comprise more than two products. It is also specified that the concentration profile is represented only to aid understanding of the development in the specific variables monitored at the observation node; it is not a matter of reconstituting the concentration profile.

Figure 12:
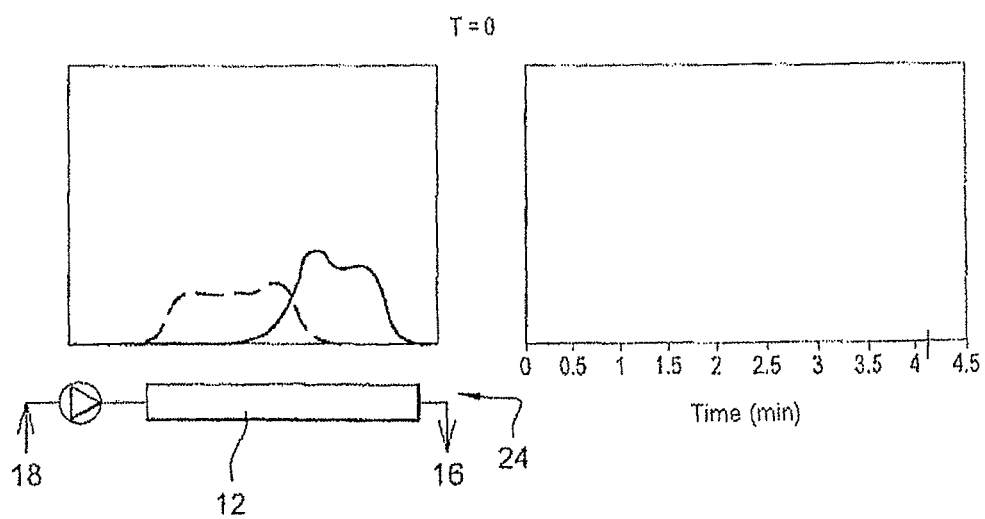
FIGS. 12 to 16, examples of operation and movement of fractions of the mixture to be separated in a discontinuous injection device.

FIG. 12 is the start of the cycle at T=0. On the left-hand side a concentration profile is seen extending along column 12. The curve shown as a solid line represents the concentration status in least retained product. At node 24, no concentration is read; the concentration profile has not reached the outlet of column 12.

Figure 13:
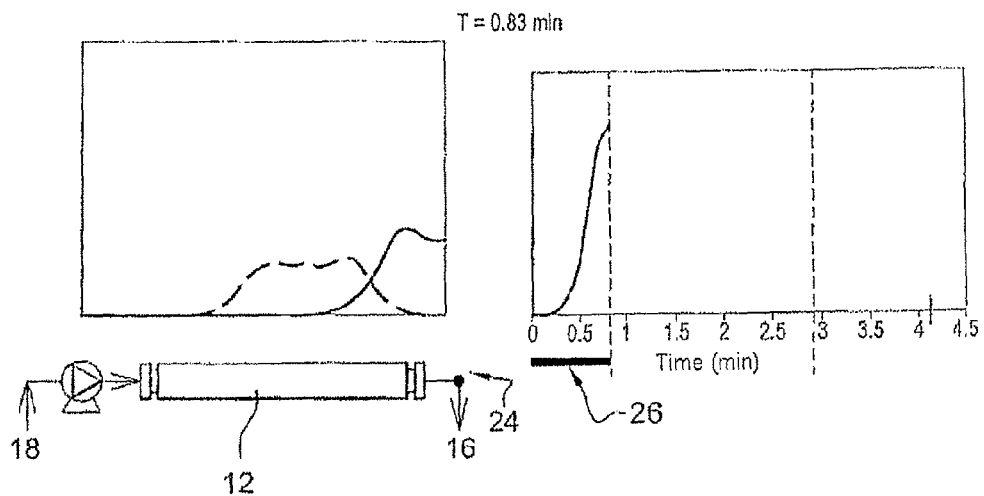

FIG. 13 shows a step of total collection of least retained product. On the left-hand side, the concentration profile has progressed along column 12. At node 24, the concentration profile is such that the raffinate concentration has increased; the history shows that the concentration of least retained product at node 24 has increased. Moreover, the collection point 16 of least retained product has appeared at the outlet of column 12; at node 24 this collection of least retained product is detected, the history indicating this collection by the line numbered 26.

Figure 14:
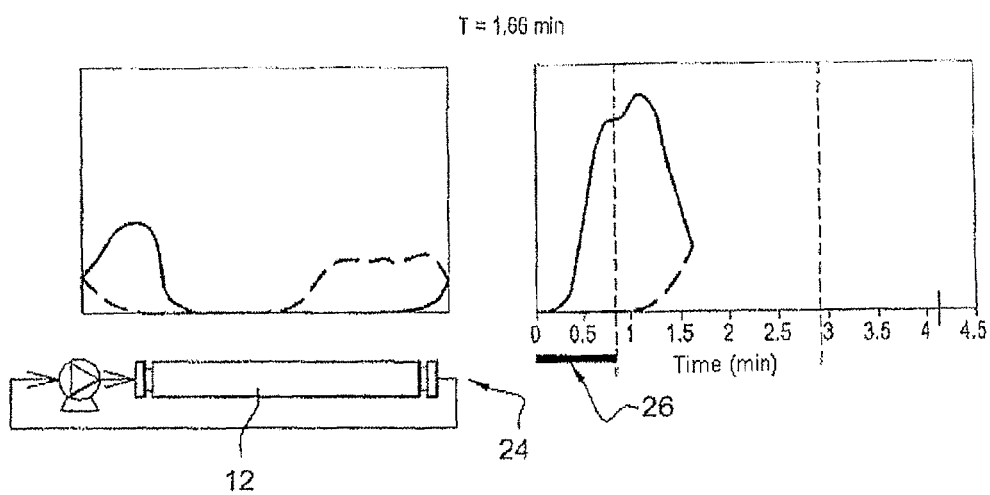

FIG. 14 shows a step where the outlet of column 12 is connected to the inlet of column 12. The injection and collection points are shifted in that the points are not connected. It is seen that the concentration profile at the column outlet 12 is extended at the inlet to column 12, evidence of the recycling of little-separated fractions. At node 24, the concentration profile is such that the concentration of least retained product first increased and then reduced; the history shows that the concentration of least retained product at node 24 has increased and reduced. Also, it is seen on the left-hand side of FIG. 14 that at node 24 the concentration profile is such that the concentration of most retained product has increased; the history shows that the concentration of most retained product at node 24 has increased. The development in the concentrations on the history also shows that the concentrations at node 24 pass through a point 28 where the concentrations are equal.

Figure 15:
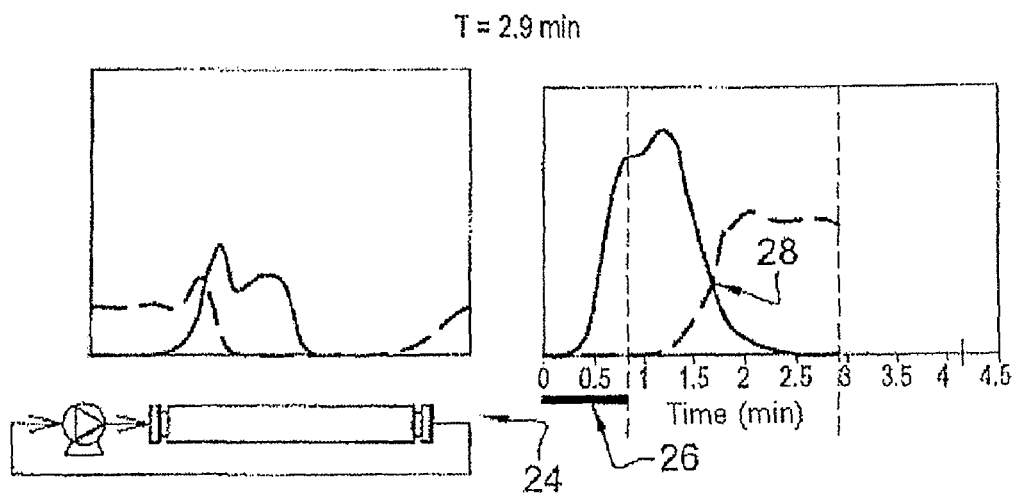

FIG. 15 shows a stage where the outlet of column 12 is connected to the inlet of column 12. At this stage (t=2.9 minutes), a mixture injection has already taken place at a point 14, not shown, between the outlet and the inlet of column 12 (see FIG. 2). The injection took place between FIGS. 14 and 15. It is seen that the concentration profile at the outlet of column 12 is extended on entering column 12, evidence of the recycling of little-separated fractions. At node 24, the concentration profile is such that the concentration of least retained product reduces until it reaches zero; the history shows that the concentration of least retained product at node 24 has reduced until it reaches zero. Also, it is seen on the left-hand side of FIG. 15 that at node 24 the concentration profile is such that the concentration of most retained product has increased then stabilizes; the history shows that the concentration of most retained product at node 24 increased then stabilizes.

Figure 16:
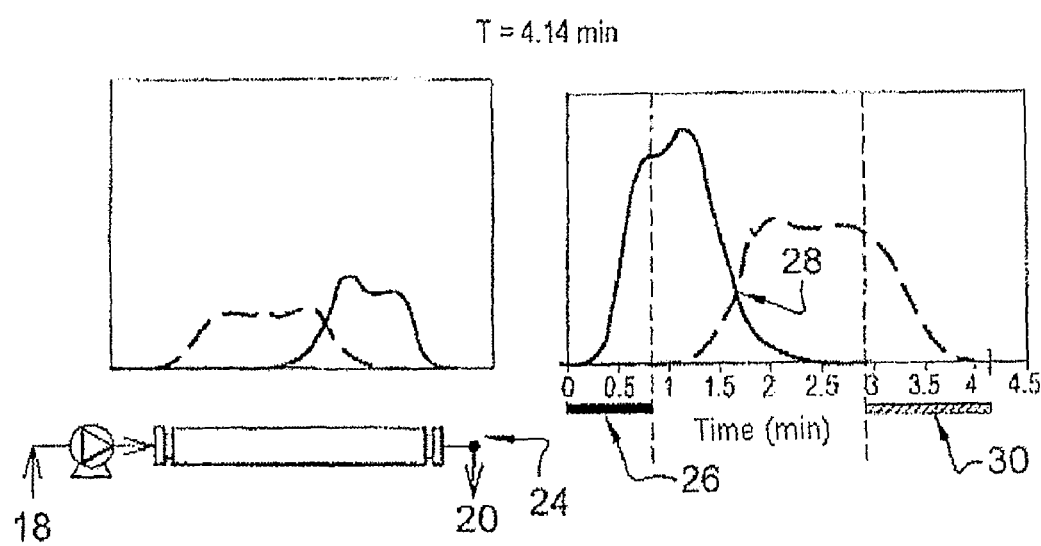

FIG. 16 shows an extract-collection step. On the left-hand side, the concentration profile has progressed along column 12. It is also seen that the injection and collection points have been shifted; the collection point 20 for most retained product appears at the outlet of column 12 and the eluent injection point 18 appears at the inlet of column 12. The profile represented corresponds to a time of 4.14 minutes towards the end of the cycle. At node 24, the concentration profile is such that the concentration of least retained product is zero; the history shows that the concentration of least retained product at node 24 is zero. At node 24, the profile shows that the concentration of most retained product has reduced to reach zero; the history shows that the concentration of most retained product has reduced, but that a collection of most retained product has been carried out. Moreover, the collection point 20 of most retained product has appeared at the outlet of column 12; at node 24 this collection of most retained product is detected, the history indicating this collection by the line numbered 30. In the minutes following t=2.9 minutes (FIG. 15), the concentration of most retained product at node 24 continues to reduce to zero towards 4.14 minutes (FIG. 16). At this moment the collection of most retained product will be interrupted, as is evidenced by the end of line 30.

The history of FIG. 16 at the observation node 24 at the outlet of column 12, reveals in the following order:

- a step of collection of a fraction enriched in a less retained product, for example the raffinate;
- a step called accumulation, where outlet and inlet of the columns integrating the observation node are interconnected, without collection, but with a discontinuous mixture injection;
- a step of collection of a fraction enriched in a less retained product, for example the extract.

On the history of FIG. 16, it will be noted that point 28 (which will be further explained below) is situated between raffinate and extract collection lines 26 and 30; this shows that this point appears at observation node 24 when the observation node 24 is found in the separation zone of the device, between the raffinate and extract collection points. The time is described here only by way of indication, for FIGS. 12 to 16, a CycloJet process naturally being capable of operating over different periods.

What has been described above with the help of FIGS. 6 to 16 shows that a history of the concentrations reflecting the development in the concentrations at the observation node is obtained; however, these histories are given only to aid understanding of the invention. As the concentration values cannot be obtained easily and directly, it is not possible to obtain a history of concentrations easily. It is therefore preferable to operate with specific variables which can be obtained more rapidly and directly. Thus, by way of an example of a specific variable, there can be mentioned:

- the rotatory power of the fractions of the mixture to be separated, obtained for example by the signal sent by a polarimeter detector, which can be used in the case where the products of the mixture to be separated are optically active, for example enantiomers.
- The absorbance or emission of a spectroscopic radiation, obtained for example by the signal sent by a spectroscopic detector for example using UV or infrared radiation, which can be used when the products of the mixture to be separated are natural or synthetic molecules having detectable chemical groups in particular biomolecules, proteins or peptides.
- The refractive index, density, conductivity or pH, obtained for example by the signal sent by detectors measuring such physical quantities, which can be used for example in the case where the mixture to be separated contains for example sugars, ionic products, acids or bases.
- the combination of several specific variables mentioned above.

Thus, the specific variables given above by way of example are variables for which a history can easily be obtained. The history is obtained with a signal representing these specific variables and is obtained directly on the device. The signals obtained with the apparatuses mentioned make it possible to obtain directly a history of a specific variable. The histories of these specific variables are obtained in real time, which makes the process efficient. The histories reflect the development in the concentrations at the observation node, in the form of an easily-obtainable signal.

FIGS. 17 to 20 show example histories of a specific variable for an SMB and a Cyclojet in the form of a signal reflecting the development in the concentrations at the observation node.

Figure 17:
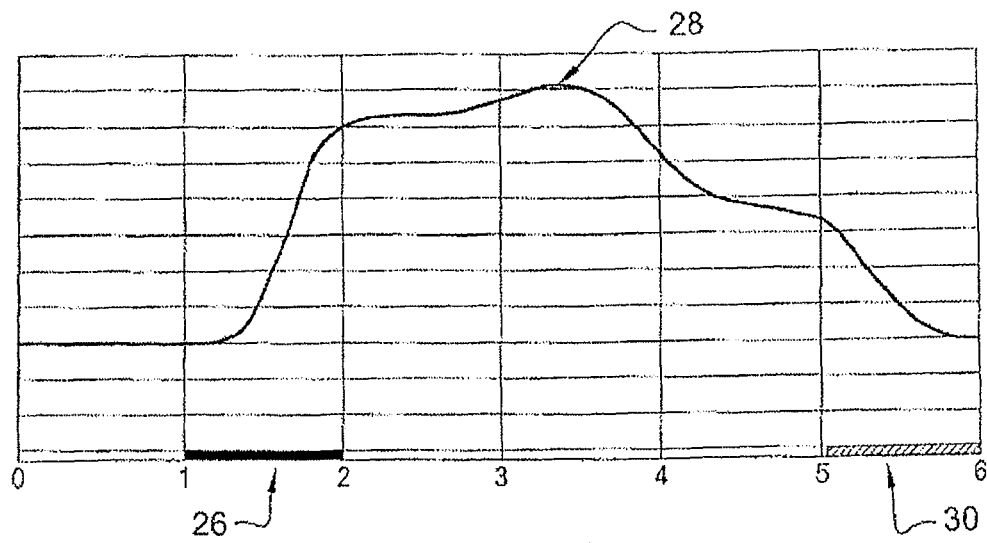
FIGS. 17 to 23, embodiments of the control of specific variables.
Figure 18:
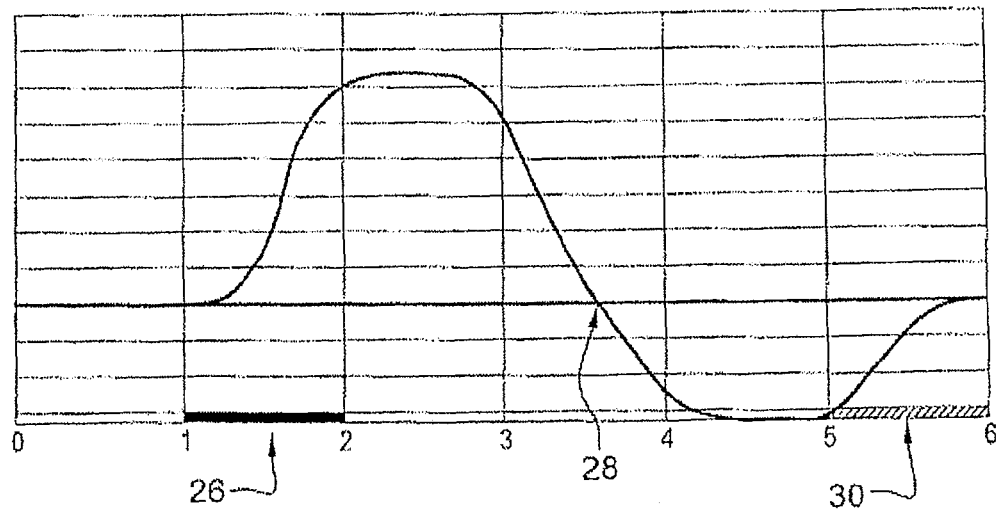

For an SMB, FIG. 17 reflects the history of the concentrations of the right-hand side of FIG. 11 in the form of an absorbance history obtained by a UV detector. FIG. 18 reflects the history of the concentrations of the right-hand side of FIG. 11 in the form of a history of the rotatory power of a mixture having enantiomers to be separated.

Figure 19:
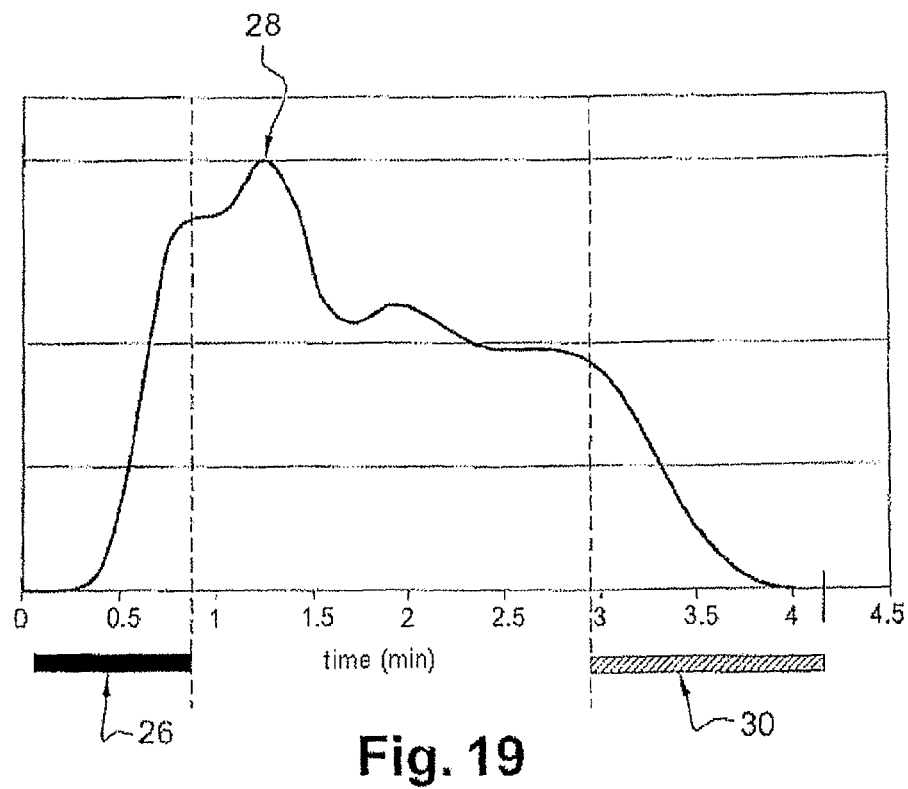
Figure 20:
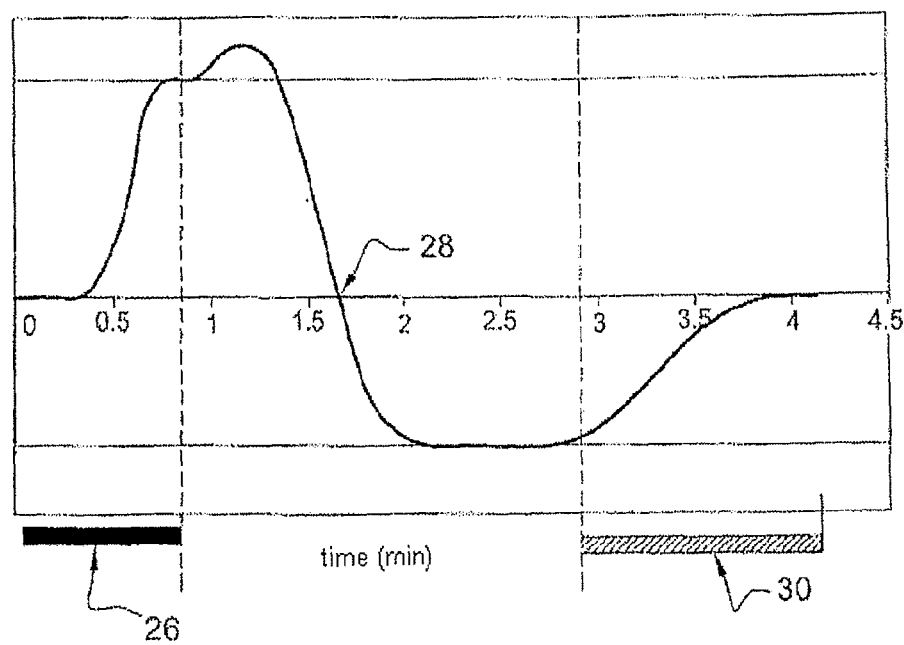

For a CycloJet, FIG. 19 reflects the history of the concentrations of the right-hand side of FIG. 16 in the form of an absorbance history obtained by a UV detector. FIG. 20 reflects the history of the concentrations of the right-hand side of FIG. 16 in the form of a history of the rotatory power of a mixture of enantiomers to be separated.

The above detectors can be located on the device, even on the lines of the device (on the recycling line); for this it can be envisaged that the fluid circulates through the detectors. This is advantageous for low flow rates of fluid in the device. For higher flow rates, it will be preferred to situate the detectors remotely from the lines; to this end diversions of small quantities of fluids can be made, on which the detectors are situated.

Monitoring the history of a specific variable at the observation node thus makes it possible for the status of this variable at a point of the device on a cycle to be known.

The separation process then comprises a step of detecting a characteristic point of the history. This step makes it possible to deduce, from the monitoring of the specific variable, the existence of a point indicating the separation process. Preferably, the characteristic point is not a precise value but indicates a feature circulating at the observation node. The characteristic point indicates a relative behaviour of the fractions circulating at the observation node. The characteristic point is situated between two successive collections, in the separation zone.

For example, the characteristic point can be the point where the concentrations of each of the products are equal; more specifically, in FIGS. 9 and 14, a point 28 is seen where the concentrations of raffinate and extract are equal. In the case of a separation of optical isomers, the isoconcentration point corresponds to a zero signal of the polarimeter. In FIGS. 18 and 20, the isoconcentration point 28 corresponds to the point where the specific variable is zero, i.e. when the history is zero. This is even simpler as the detection of the zero one signal of a signal maximum is not subject to precise calibration constraints of the device. In another embodiment of the invention, another type of characteristic point can be an inflexion point, a height or a gradient corresponding to a threshold value.

By way of another example, in the case of mixtures of molecules responding to one or more detectors, a characteristic point can correspond to a combination of the signals sent by this or these detector(s). For example, in the case of two products with different absorptions at two UV wavelengths, the equality of two dependent functions of the absorbances can be the characteristic point. The characteristic point can be also the point where the history passes through an extremum; the characteristic point can be the maximum of a signal obtained by a UV detector measuring the absorbance of the products of the mixture at a wavelength, the specific variable being the absorbance of the products of the mixture at one wavelength. In FIGS. 17 and 19, the characteristic point is for example the maximum of the history and therefore the maximum of the signal (in FIG. 19, this corresponds approximately to t=1.25).

Generally, a characteristic point is characterized in that if this point passes the observation node when a collection is carried out there, the purity of this same collection is degraded. The position of this characteristic point is then a datum making it possible to anticipate the value of the purities and yields of the device.

As indicated above, an advantage of the process according to the invention is that the history can be monitored over a period of less than one cycle. During the monitoring stage, it is sufficient to detect the characteristic point, to then pass to the next stage of the process. For example, in FIGS. 6 to 16, it is seen that point 28 appears before the end of a cycle; this is reflected in FIGS. 17 to 20 by the possibility of stopping the monitoring of the history as soon as the characteristic point 28 appears. Preferably, the monitoring step is carried out over a cycle. Moreover, the steps of monitoring and detecting the characteristic point can be implemented at a frequency corresponding to a whole number of cycles (every n cycles, n being greater than or equal to 1). The more frequently the steps of monitoring and detection are performed, the more precise is the regulation of the operation of the device.

The process according to the invention also comprises a comparison step of the position of the characteristic point with a target position. The detection of the characteristic point can be treated the same as the detection of the time at the end of which the characteristic point appears at the observation node during the period of the monitoring, for example a cycle; the target point then corresponds to the time at the end of which the characteristic point should appear at the observation node. On a history corresponding to the development over time of a specific variable, the comparison step consists of comparing the x-axis of the characteristic point with a target x-axis. This makes it possible to determine if a disturbance took place in the device. In a suitably regulated device, preferably without disturbance and in steady state, the position of the characteristic point is concomitant with the target position. If the device is not disturbed, the characteristic point appears at the observation node 24 at substantially the same moment in each cycle. Comparing the position of the characteristic point with the target position can then correspond to a difference in passage time at the observation point 24.

Figure 21:
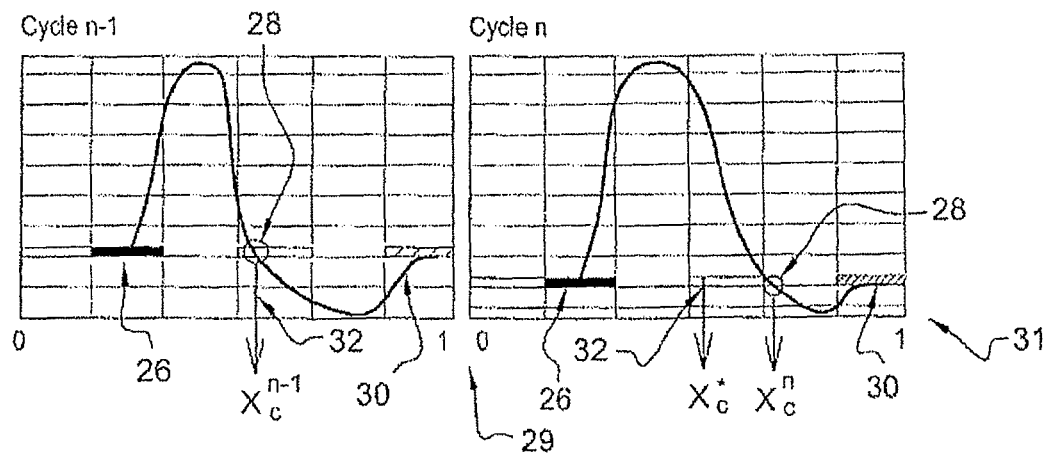

FIG. 21 shows an example of comparison of the position of the characteristic point with the target position. FIG. 21 shows histories monitored during the monitoring stage in a node 24 of a continuous-injection SMB type or discontinuous injection CycloJet type, for various cycles. The specific variable chosen is for example the rotatory power measured by a polarimeter detector in the case where the least retained product causes a positive rotation and the least retained product a negative rotation. Moreover, lines 26 and 30 are also shown, corresponding respectively to the raffinate and extract collections.

On the first cycle (n−1) of FIG. 21, the device is not disturbed and the comparison of point 28 with the target position 32 (the x-axis of which is respectively $x_c^{n-1}$ and $x_c^*$) shows that there is a superimposition of the positions of the target position and the characteristic point; the position of the characteristic point coincides with the target position.

In the case where a disturbance takes place after the detection of point 28, on the following cycle (n), point 28 is shifted for example to the right relative to the target position $x_c^*$, i.e.: the history cuts the x-axis further to the right than the axis $x_c^*$, which means that the characteristic point 28 has traveled "in front of" the observation node with a delay compared with the target position 32. Thus, the x-axis of point 28 of the second history has come closer to the extract collection 30. This means that point 28 reached the observation node later in relation to the target position and has come closer to the extract collection; there is then a risk that the purity of this collection will reduce. It therefore advisable to respond with an adjustment 31 to this shift due to the disturbance 29, in order to make the position of the characteristic point coincide with the target position.

The process then comprises a step of adjusting the quantity of mobile phase modifying the position of the characteristic point if a difference appears between the position of the characteristic point and the target position. In other words, a difference between the position of the characteristic point and the target position means a disturbance to the operation of the device that can easily be modified by adjusting only the quantity of mobile phase. This step is the reaction to a shift observed in FIG. 21.

The mobile phase, corresponding to the fluid circulating in the device, allows the shifting of the fractions in the device. In FIGS. 6 to 20, the characteristic point 28 shifts in the device by means of the mobile phase. The mobile phase carries the characteristic point along the device. On an SMB- or VariCol-type device, the characteristic point rotates around the device through displacement by the mobile phase; on a CycloJet-type device, the characteristic point shifts along the column(s). Thus, it is therefore the shifting of the mobile phase which allows the shifting of the characteristic point over the whole of the device (for example over a cycle). The mobile phase is set in movement in the device. The quantity of mobile phase is defined by the product of a flow rate times the operating cycle time. The quantity of mobile phase can then be modified by modifying the flow rate and/or the cycle time.

According to FIGS. 6 to 20, it is noted that the characteristic point is situated between two fraction collections; during the adjustment step it is therefore sought to modify the quantity of mobile phase in order to vary the position of the characteristic point between these two collections.

For example, in a continuous-injection device, the quantity of mobile phase can be adjusted by modifying the flow rate for a certain time; the modification of the flow rate for a certain time, for example a cycle, makes it possible to adjust the quantity of mobile phase. In particular, it is possible to modify the quantity of mobile phase in a targeted fashion in the device. The devices allowing the use of the SMB or VariCol processes comprise a plurality of zones such as previously described. In particular, there is a separation zone between two fraction collection points. This zone more precisely comprises two zones, a zone 2 and a zone 3, as defined above. Zone 2 can comprise at the inlet a collection point of a fraction, for example the most retained or extract, and at the outlet, a mixture injection point; the zone 3 can comprise at the inlet, the mixture injection point and at the outlet, a collection point of a fraction, for example the least retained or raffinate. The quantity of mobile phase can be adjusted over the zone 2. The quantity of mobile phase in zone 2 can be adjusted in several ways, for example by modifying the flow rate of fraction collection at the collection point at the inlet of zone 2. The flow rate of the mobile phase in zone 1 can also be modified without modifying the quantity of fraction drawn off at the collection point at the inlet of zone 2; which modifies the flow rate in zone 2.

Preferably, the quantity of mobile phase excluding the volume of mixture injected is adjusted (without taking account of the volume of mixture injected); preferably, during the present routine of positioning the characteristic point, without modifying the quantity of mixture injected. Thus, it is possible to modify the quantity of mobile phase in zone 3 by adjustment of the quantity of mobile phase in zone 2. If the quantity of mixture injected is constant or varies slightly, the variation in the quantity of mobile phase in zone 3 is then dependent on the variation of the quantity of mobile phase in zone 2; the quantity of mobile phase in zones 2 and 3 can then be adjusted in a dependent fashion, but only by adjusting the flow rate in zone 2.

For example, in a discontinuous injection device, if a difference of position between the characteristic point and the target position appears, then regulating the device can be carried out. For example, the quantity of mobile phase can be modified. The quantity of mobile phase can be adjusted by modifying the cycle time at a given flow rate. In a CycloJet, operated with a same flow rate, the quantity of mobile phase is modified by varying the application time of the flow rate. Over a modified operating cycle, the quantity of mobile phase in a CycloJet, corresponding to the product of the flow rate times the cycle time, is modified.

Preferably, the quantity of mobile phase excluding the volume of mixture injected is adjusted; preferably, during the present routine of positioning the characteristic point, the value of the volume of mixture injected during a cycle is disregarded.

In the case of a continuous injection device, an SMB for example, the process described in its first routine is advantageous in particular in relation to the article "Optimal operation of simulated moving bed chromatographic processes by means of simple feedback control" by H. Schamm, S. Grimer, A. Kienle, Journal of Chromatography A, 1006 (2003), 3-13, mentioned above; in this article, an individual regulation of the flow rates of each of the zones is carried out. A limitation of this article is found in the case of systems where the flow rate of mixture to be separated is small in comparison with the flow rate in zone 2. Thus, a small variation in the flow rate in zone 2 or in zone 3 then causes a strong variation of the flow rate of mixture to be processed, greatly disturbing the system and its regulation.

In the case of the present invention, the positioning of the characteristic point takes place for example by adjusting only the flow rate in zone 2 without taking account of the flow rate of mixture to be separated which can be modified by another independent routine described hereafter. The routine of positioning the characteristic point is not affected by the value of the volume of feed injected over a cycle.

In the case described by FIG. 21, in order to position the characteristic point (or make it coincide) on the set point ($x_c^*$) in the following cycle, it is possible to carry out a modification to the quantity of mobile phase modifying the position of the characteristic point; the characteristic point having appeared after its target position, in order to correct this deviation, the volume of mobile phase modifying its position can therefore be increased. For example by acting on the flow rate in zone 2, or the period of the system in the case of an SMB or VariCol process. More generally, the modification of a volume or a quantity of mobile phase which is the product of an average flow rate times a cycle time can be carried out by modifying the flow rate or by modifying the cycle time.

If the adjustment concerns the flow rate, the latter will for example be increased if the position of the characteristic point is situated after the target point or reduced in the contrary case. If the adjustment concerns the cycle time, the latter will for example be increased if the position of the characteristic point is situated after the target point or in the contrary case, reduced.

Thus, the adjustment of the quantity of mobile phase makes it possible to vary the passage of the fractions at the observation node 24. The characteristic point 28 can be ahead of the target point 32. By reducing the quantity of mobile phase, the circulation of the fractions can be slowed down, and the characteristic point 28 retarded, so as to position it at the target point 32. Conversely, if the characteristic point 28 is delayed relative to the target point 32, the quantity of mobile phase is increased in order to accelerate the circulation of the fractions, and accelerate the characteristic point so as to position it at the target point. If the characteristic point is stabilized at the target point, this means that there is then no adjusting modification to be carried out. It can also be envisaged to set a difference threshold between the characteristic point and the target point; the adjustment is carried out if the difference exceeds the threshold.

It is of course also envisaged that the adjustment can be implemented without waiting for the characteristic point to appear and the difference of position with the target position to be noted; the adjustment can also take place such that the characteristic point appears directly at the target position. This allows an even more precise adjustment of the operation by the process. Also, this makes it possible to react rapidly to a disturbance.

An adjustment of this type is simple to implement; it is possible for example to use a PID controller acting on the quantity of mobile phase. Other methods can also be used.

The previously-described monitoring, detection, comparison and adjustment steps are the steps of the first routine or routine of positioning the characteristic point.

The advantage of this described process in its routine of positioning the characteristic point is that it makes it possible to react rapidly to the disturbances of the device, contrary to the processes described in the prior art. Generally, processes based on the analysis of the composition of the collected fractions do not allow a rapid reaction to disturbances the effects of which require several cycles to stabilize. In some cases a long time period is required to analyze and obtain values for purities (up to approximately ten cycles). The time period for analysis of the compositions is even longer because it is preferable to sample the fractions of the chromatography device over a complete cycle, these samples then being analyzed; thus the purity results can be obtained only several cycles later, which makes it more difficult to carry out the adjustment and to determine the adjustment to be applied. There is thus a reactivity delay of the accumulation systems following modifications of operating parameters or following disturbances, to which an analysis delay may be added.

Contrary to the processes described in the prior art, the present process makes it possible to react immediately to disturbances, even within the operating cycle during which a disturbance takes place. Not only is detection of disturbances rapid, the adjustment implemented to re-establish the device is also equally rapid.

The process can moreover comprise a second routine, or routine of defining the target position. This routine of defining the target position is carried out preferably at least partly in parallel with the routine of positioning the characteristic point. The second routine makes the target position variable. The routine of defining the target position makes it possible to improve the already described process, so as to optimize the target position relative to the desired purities. The target position 32 can be such that it is "sufficiently" remote (in time) from the raffinate and extract collections as is the case on the first history in FIG. 17, if the purity of both fractions (in the case of a binary mixture) is important. However, it may be that the purity of a single fraction is important; then the target position can be moved closer to one or other of the raffinate or extract collections. According to an embodiment of the invention, it is also possible to measure a quantity of the target product and its yield linked to the presence of target product lost in the other collections. This yield is directly linked to the purity of the other fractions. Thus it is possible in the present invention to use equally constraints of purities and/or yields, a single type of constraints being involved, but differently posed.

In order to define the target position, the process can comprise a step of collecting at least one fraction. This step is carried out at one of the collection points 16 or 20. Preferably, the fraction comprising the product of interest is collected. Then, the purity of the fraction is measured and compared with a predetermined purity so as to define the target position. It can also be envisaged to collect two fractions, measure the purity of the two fractions and compare these purities with predetermined purities so as to define the position of the target point.

It should be noted that the measurement of the purity of the fractions can be subject to some delay. However, this does not penalize the process, since the routine of defining the target position is carried out at least partly in parallel with the routine of positioning the characteristic point; the definition of the new target position can then be used at each new available measurement or even at every cycle, considering simply the latest available measurements.

During the purity analysis delay, the process continues to adjust the operation of the device according to the first routine by comparing the characteristic point with the target position in the course of validity.

In order to calculate the position of the target point, several methods are possible. It is possible to pre-define the following variables:

$P^*_{ext}$: Target purity at the extract
$P^*_{raff}$: Target purity at the raffinate
$P_{ext}$: Purity at the extract
$P_{raff}$: Purity at the raffinate
$\epsilon_{ext} = (P_{ext} - P^*_{ext})$
$\epsilon_{raff} = (P_{raff} - P^*_{raff})$ According to a first method, a PID type controller is applied on $\epsilon_{ext}$ or $\epsilon_{raff}$. Thus, if $\epsilon_{ext}$ is negative, the target position will be distant from the extract line (the target position is closer to the raffinate line). Similarly, if $\epsilon_{ext}$ is positive, the target position will be closer to the extract line (the target position is distant from the raffinate line). The adjustment will be the same for a PID controller applied to $\epsilon_{raff}$. If $\epsilon_{raff}$ is negative, the target position will be distant from the raffinate line (the target position is closer to the extract line). Similarly, if $\epsilon_{raff}$ is positive, the target position will be closer to the raffinate line (the target position will be distant from the extract line).

According to a second method, a PID controller is applied to the combination of the deviations $\epsilon_{ext}$ and $\epsilon_{raff}$.

According to a third method, a function dependent on the purities obtained and the target purities is used directly to calculate the fresh position of the characteristic point.

During the step of defining the target position, the target position can also be defined following the modification of the position of the mixture injection on the history. This makes it possible to adapt to changes of position of the injection point.

The process can moreover comprise a third routine or routine of modification of the quantity of mixture injected. This routine of modification of the quantity of mixture injected is also carried out preferably at least partly in parallel with the previously-described routines of positioning the characteristic point and defining the target position. The routine of modification of the quantity of mixture makes it possible to further improve the already-described process, so as to optimize production while respecting the purity constraints of the fractions.

The third routine can comprise a step of collecting at least one fraction. This step is carried out at one of the collection points 16 or 20. Preferably, the fraction comprising the product of interest is collected. Then the purity of the fraction is measured and compared with a predetermined purity so as to define the target position. It can also be envisaged to collect two fractions, measure the purity of the two fractions and compare these purities to predetermined purities so as to define the position of the target point.

The process then comprises a step of modifying the quantity of mixture used according to the difference in the measured purities compared with the predetermined purities. In the case of a binary mixture for example, if the two extract and raffinate purities are both higher than the predetermined purities, this means that the purities exceed the specifications; the quantity of mixture can be increased to "degrade" the purities to the specified values. If the extract and raffinate purities are both below the predetermined purities, this means that the purities are below the specifications; the quantity of mixture can be reduced to improve the separation and increase the purities to the specified values. This can also be done when only one purity is of interest. A quantity of the target product and its yield linked to the presence of target product lost in the other collections can also be measured. This yield is directly linked to the purity of the other fractions.

The modification of the quantity of mixture can be carried out:

by increasing the flow rate of mixture injection into continuous injection devices
by increasing the volume injected into discontinuous injection devices.
by reducing the cycle time in discontinuous injection devices in order to increase the frequency of the injections.

The modification of the quantity of mixture causes a disturbance which can result in the movement of the characteristic point compared with the target position. The process then allows the routine of positioning the characteristic point to be used to stabilize the operation of the device and allows the routine of defining the target position to be implemented. The routines of defining the target position (second routine) and modifying the quantity of mixture (third routine) can be implemented independently of each other at least partly in parallel with the routine of positioning the characteristic point (first routine). When the second and third routines are implemented, the fraction(s) collection(s), the measurement(s) of the purities and the comparison of predetermined purities can be carried out for both routines.

To define the quantity of mixture (or feed) to be injected, the following procedure can be adopted. Let the variables be the following:

$P^*_{ext}$: Target purity at the extract
$P^*_{raff}$: Target purity at the raffinate
$P_{ext}$: Purity at the extract
$P_{raff}$: Purity at the raffinate According to a first process, PID controls can be carried out on a variable obtained from the differences between one or more purities at their target value. Another possibility is also to use only the value of a function dependent on the purities obtained and the target purities to calculate the fresh quantity to be injected.

The three above routines make it possible to adjust the purities of the extract and raffinate lines by acting on the separation properties of the fractions of the mixture to be processed: typically, on a history, adjustment is according to development between the steps of collecting the raffinate, injecting the feed and collecting the extract. For example on an SMB or VariCol process, adjustment depends on what is observed on the history when the observation node is located in or at the boundary of zones 2 and 3. For example on a CycloJet, adjustment is carried out in relation to what is observed on the history during the recycling stage of a CycloJet.

Chromatographic processes also comprise at least one zone or one sequence dedicated to the desorption of the most retained product, typically carried out by zone 1 of the SMB and VariCol processes and by the last step of a CycloJet sequence. Chromatographic processes also comprise at least one zone or one sequence dedicated to the adsorption or collection of the least retained product, typically carried out by zone 4 of the SMB and VariCol processes and by the first step of a CycloJet sequence. Thus, the process can also comprise a fourth routine consisting in the regulation of the adsorption and desorption zones or sequences. This regulation makes it possible to prevent instances of contamination of an incomplete desorption of the most retained product and an adsorption or insufficient collection of the least retained product. This routine can operate with the monitored history in the first routine or use the history from another detector and it is sometimes preferable to define another origin for the x-axis of this fresh history. In the following examples, this is a UV (Ultra Violet) detector for this fourth routine while the first three routines use either a UV detector (SMB example) or a polarimeter (VariCol example).

Figure 22:
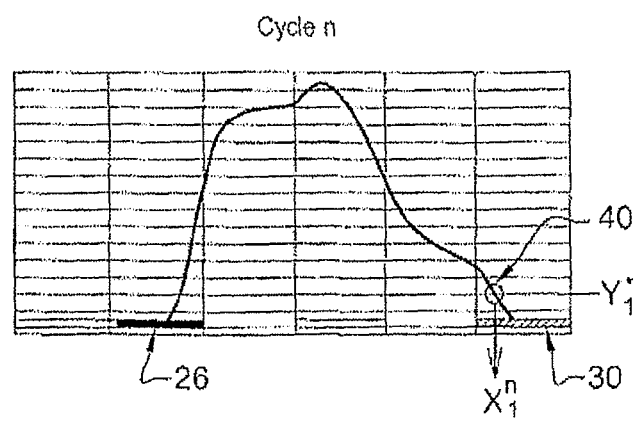
Figure 23:
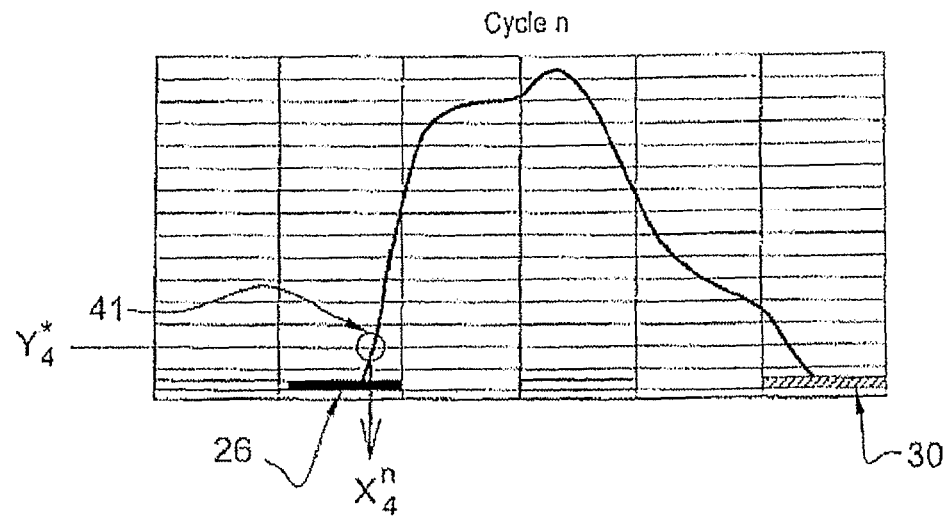

If the choice is to monitor a fresh history, a fresh observation node can then be chosen. The history of a specific variable is monitored; the examples of variables given in connection with the first routine can be applied here. The history is seen in FIGS. 22 and 23. These Figures show a history of the absorbance or emission of a spectroscopic radiation obtained by a UV detector. The line 30 corresponds to the fraction collection containing the least retained product (raffinate), the raffinate collection being detected at the observation node before the injection stage and before the collection of extract (fraction containing the most retained product) corresponding to the line 26.

A second characteristic point 40 of the history (FIG. 22) can then be detected, dedicated to the adsorption or the collection of a fraction of the less retained mixture, situated between the step of drawing-off or collecting less retained fraction and the eluent-injection step; in the case of an SMB or VariCol, this is a characteristic point situated in zone 1. In the case of a CycloJet, this is the first sequence.

It is also possible to detect a third characteristic point 41 of the history (FIG. 23), dedicated to the desorption or the collection of a more retained fraction of the mixture, situated between the eluent-injection step and the step of collecting or drawing-off retained fraction; in the case of an SMB or a VariCol, this is a characteristic point situated in zone 4. In the case of a CycloJet, this is the last sequence.

The fourth routine also comprises, for each second and third characteristic points, the comparison of the position of the characteristic point with a target position. Finally, the quantity of the mobile phase modifying the position of the second and third characteristic points is adjusted if a difference of position vis-à-vis the respective target position appears.

In SMB and VariCol for example, during this routine, other characteristic points are detected and the flow rates in zone 1 and 4 will be modified in order to position the characteristic points on respective set point positions in zone 1 and 4. This routine is independent of the three previous ones. Adjustment of the flow rate in zone 1 is according to a characteristic point defined for example by a threshold value of the UV signal. According to FIG. 22, variables are defined:

$Y_1^*$: threshold of the UV signal,
$X_1^*$: x-axis in set point zone 1,
$X_1^n$: x-axis in zone 1 having as y-axis $Y_1^*$ in cycle n, If in cycle n, $X_1^n$ is higher than the x-axis $X_1^*$ the flow rate in zone 1 will for example be increased; in the contrary case, it can be reduced.

In CycloJet for example, the x-axis $X_1^*$ is preferably located in the period of time where the collection of extract is carried out close to the monitoring node. If, in cycle n, $X_1^n$ is higher than the x-axis $X_1^*$ the duration of the stage of collecting the extract will be increased, and can be reduced in the contrary case.

Adjustment of the flow rate in zone 4 is carried out according to a characteristic point defined by a threshold value of the UV signal. According to FIG. 23, variables are defined:

$Y_4^*$: threshold of the UV signal,
$X_4^*$: x-axis in set point zone 4,
$X_4^n$: x-axis in zone 4 having as y-axis $Y_4^*$ in the cycle n, In SMB and VariCol, if in cycle n, $X_4^n$ is higher than the x-axis $X_4^*$ the flow rate in zone 4 will for example be increased; inversely, it can be reduced.

In CycloJet for example, the x-axis $X_4^*$ is located preferably in the period of time where the collection of extract is carried out close to the monitoring node. If, in cycle n, $X_4^n$ is lower than the x-axis $X_4^*$ the duration of the stage of collecting the extract will be increased, it can be reduced in the contrary case.

The invention also relates to a device such as those previously described. The device comprises a command logic suitable for implementing the above process. The device is thus adjusted automatically. In particular, the command logic is suitable for implementing at least partly in parallel the various previously-described routines of positioning the characteristic point, defining the target point, modifying the quantity of mixture and regulating adsorption and desorption phenomena of the fractions of the mixture to be processed.

Examples will now be given.

EXAMPLE 1

This example illustrates the different stages of the separation process on a continuous-injection separation device of VariCol type. The chosen separation is that of isomers of the racemic mixture SB-553261 (Application of the "VARICOL" process to separating the isomers of the SB-553261 racemate, O. Ludemann-Hombourger, G. Pigorini, R. M. Nicoud, D. S. Ross, G. Terfloth, Journal of Chromatography A, 947 (2002) 59-68).

In this example, the routines of positioning the characteristic point, defining the target point, modifying the quantity of mixture use the signal of a polarimeter detector as specific variable; the characteristic point used is the point situated between the raffinate and extract collections where the polarimeter signal is zero. The routine of regulating the adsorption and desorption phenomena of the fractions of the mixture to be processed uses the signal of a UV detector as variable.

The racemic mixture can be separated on a Chiralpak AD phase (Chiral Technologies Europe) with a particle diameter of the order of 20 μm. The eluent used for the separation is an acetonitrile/methanol mixture (80/20, v/v). The separation takes place at the temperature of 25° C.

In order to be able to numerically simulate the separation, a model of the latter can be determined. It is noted that this does not involve the construction of a model for the adjustment of the process but simply for simulating the device—the adjustment routines being strictly independent. The device used is a 6-column VariCol having a diameter of 1 cm and length of 8.1 cm. In the case of this example, the separation is simulated by a cascade mixer model using 40 trays/column. The columns are distributed as follows:

| Total number of columns | Average number of columns in Zone 1 | Average number of columns in Zone 2 | Average number of columns in Zone 3 | Average number of columns in Zone 4 |
|---|---|---|---|---|
| 6 | 1 | 2.25 | 2 | 0.75 |

The feed used is at a concentration of 32 g/L. The aims are to obtain a purity of 99% at the extract and 99% at the raffinate.

The first routine consists of positioning a characteristic point of the separation zone in a target position. This first routine does not require precise analysis.

The considered history is expressed in reduced time, i.e. time divided by cycle time, varying between 0 and 1. The origin of the history corresponds to the moment when the eluent comes close to the observation node. The target position is fixed at the mixture injection point (i.e. at 0.54 on the x-axis of the history corresponding to the middle of the injection period).

In this example, the adjustment is started after stabilization of the device, i.e. in cycle 15, the system is then adjusted such that the position of the characteristic point is situated at the target position fixed at the middle of the injection period. During the adjustment, a 2.1% variation of the retention time is carried out in cycle 50 by increasing the constants of adsorption by the same value. In this example, the flow rate in zone 2 to be applied to cycle n+1 is calculated using the following hypotheses and data:

the flow rates in zone 2 applied during cycles n−1 and n.
the x-axes Xn−1 and Xn of the characteristic points of cycles n−1 and n
the hypothesis that the conditions of elutions are the same for cycles n−1, n and n+1.—

Figure 24:
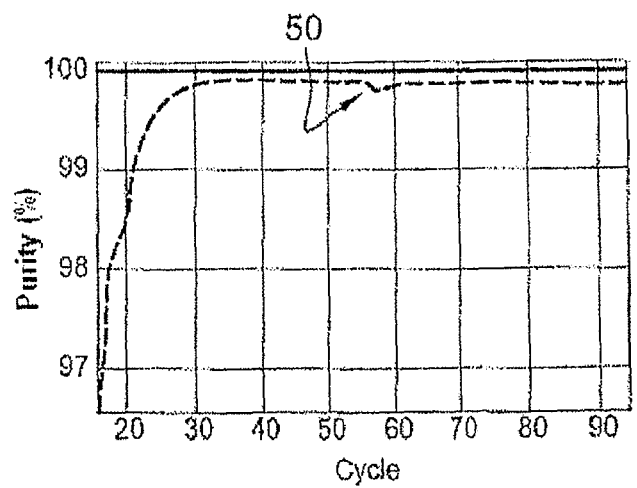
FIGS. 24 to 50, illustrations of examples of operation.

FIG. 24 shows the effect of the first routine on the purities of the products extract (dotted line curve) and raffinate (solid line curve) with a fixed target position with a retention-time variation indicated by the arrow 50 during the adjustment.

The starting operating conditions are:
$Q_1$=16.3 mL/min
$Q_2$=7.6 mL/min
$Q_{mixture}$=0.4 mL/min
$Q_4$=4.82 mL/min
T=1.11 min Where $Q_1$, $Q_2$, $Q_{mixture}$ and $Q_4$ are respectively the flow rates in zones 1, zones 2, the flow rate of mixture to be processed and the flow rate in zone 4, these zones are defined identically for the SMB and VariCol processes and represented in FIG. 1.

Figure 25:
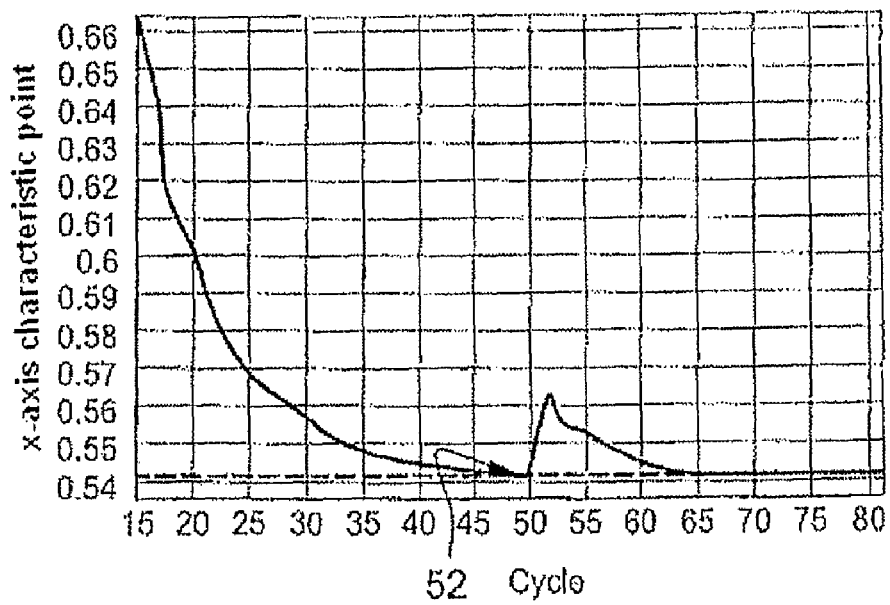

These flow rates result in a raffinate purity close to 100% and an extract purity of 96.7%. The flow rates after adjustment are:
$Q_1$=16.3 mL/min
$Q_2$=7.83 mL/min
$Q_{mixture}$=0.4 mL/min
$Q_4$=4.82 mL/min
$\Delta T$=1.11 min In this case, the raffinate purity is not modified but the extract purity is substantially improved as a result of having moved the characteristic point to the target position. In cycle 50, a 2.1% disturbance is carried out resulting in a 2.1% increase in the retention time. The flow rates after disturbance are:
$Q_1$=16.3 mL/min
$Q_2$=8 mL/min
$Q_{mixture}$=0.4 mL/min
$Q_4$=4.82 mL/min
$\Delta T$=1.11 min FIG. 25 represents the development in the characteristic point (solid line) during the separation process. It is observed that the first routine moved the characteristic point of an x-axis from 0.66 to the target x-axis of 0.54. In cycle 50, the position of the characteristic point is modified by the disturbance of the retention (arrow 52). As the routine is still active, the characteristic point is rapidly brought to the target position (dotted line), thus avoiding a drop in purities as FIG. 24 shows.

Figure 26:
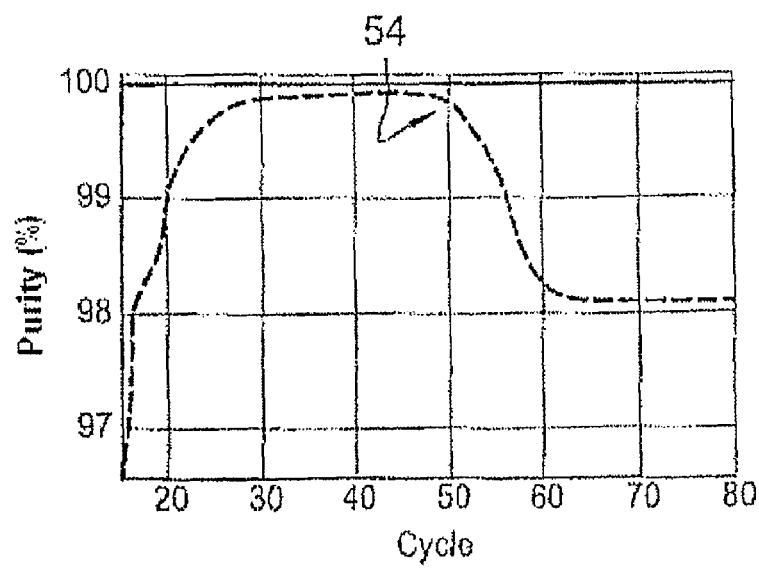

In order to better see the advantage of the process, FIG. 26 illustrates the impact of the variation of the retention on the purities when the first routine is deactivated in cycle 45. It is seen that, without activation of the routine, the extract purity (dotted line) reduces when the retention time varies (arrow 54).

Figure 27:
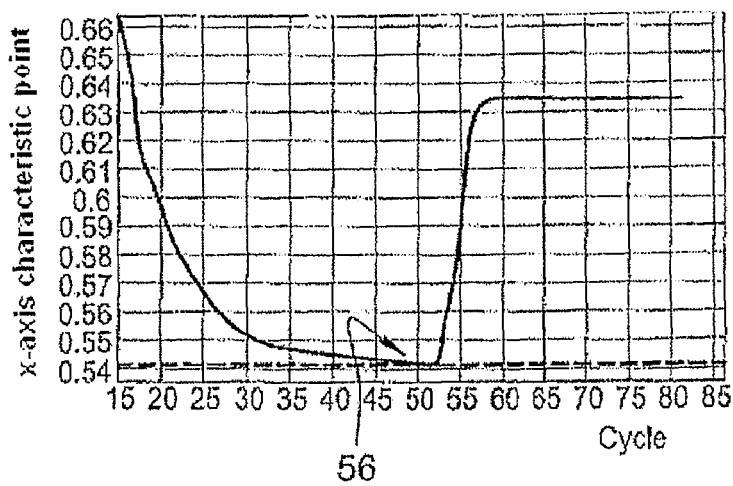

FIG. 27 shows the development in the characteristic point (solid line). When the first routine is deactivated, the position of the characteristic point deviates from the target position starting from the arrow 56 (dotted line) causing a contamination of the extract line.

The second routine defining the target position uses the purities of the extract and raffinate lines in order to best position the target position of the first step. During this routine, the target position is modified so that the extract and raffinate products purities are greater than or equal to 99%.

This routine modifies the target position of the characteristic point adjusted by the first routine (acting on the flow rate in zone 2). The modification of the target position of the characteristic point takes into account a function dependent on the purities obtained and the target purities.

Figure 28:
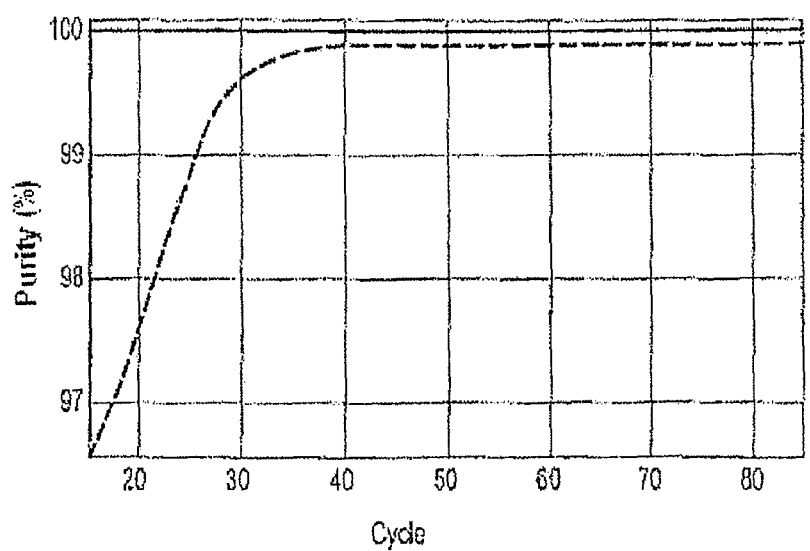

FIG. 28 shows the positioning of the characteristic point (first routine) with definition of the target point (second routine). The extract is shown as a dotted line and the raffinate, as a solid line. It is seen that the extract purity remains above the specified 99%.

The starting flow rates are:
$Q_1$=16.3 mL/min
$Q_2$=7.6 mL/min
$Q_{mixture}$=0.4 mL/min
$Q_4$=4.82 mL/min
$\Delta T$=1.11 min The flow rates after adjustment are:
$Q_1$=16.3 mL/min
$Q_2$=7.84 mL/min
$Q_{mixture}$=0.4 mL/min
$Q_4$=4.82 mL/min
$\Delta T$=1.11 min The third routine is added and modifies the quantity of feed injected according to the analyses. A consequence of this routine is disturbance of the process and the first and second routines allow adaptation to these disturbances. The process is disturbed to improve the quantity of product that the process can treat. The modification of the quantity of feed takes account of a function dependent on the purities obtained and the target purities.

Figure 29:
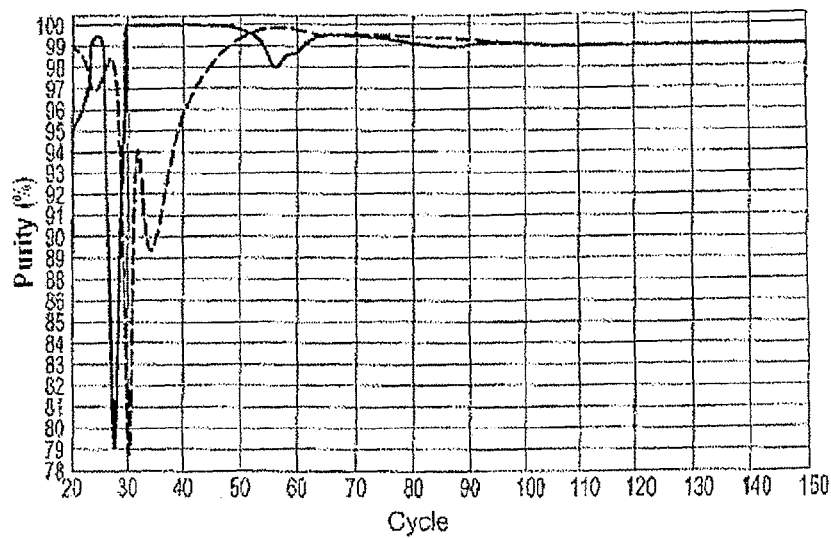

FIG. 29 shows the effect on the raffinate and on the extract of the positioning of the characteristic point when the quantity of mixture is modified. The raffinate is shown as a solid line and the extract, as a dotted line.

The starting flow rates are:
$Q_1$=16.3 mL/min
$Q_2$=7.6 mL/min
$Q_{mixture}$=0.52 mL/min
$Q_4$=4.82 mL/min
$\Delta T$=1.11 min The starting feed flow rate is greater than the optimum flow rate. In other words, under the starting conditions, it is impossible to obtain an extract and a raffinate with a purity of 99%. The flow rates after adjustment are:
$Q_1$=16.3 mL/min
$Q_2$=7.62 mL/min
$Q_{mixture}$=0.46 mL/min
$Q_4$=4.82 mL/min
$\Delta T$=1.11 min The third routine has adapted the feed flow rate to make it possible to achieve the specifications of 99% purity for the different fractions.

The fourth routine consists of the adjustment of zones 1 and 4. This adjustment must prevent instances of contamination from zones 1 and 4. It does not require analysis.

In this example, the flow rates in zone 1 and 4 to be applied to cycle n+1 are calculated using the following hypotheses and data:
the flow rates in zone 1 and 4 applied during cycles n−1 and n.
the x-axes of the points in zone 1 and zone 4 of cycles n−1 and n
the hypothesis that the conditions of elutions are the same for cycles n−1, n and n+1.

Figure 30:
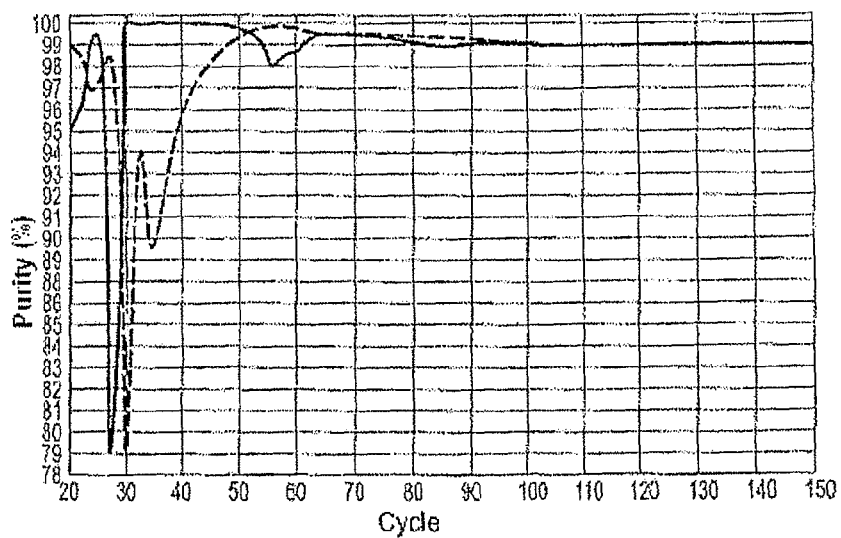

FIG. 30 shows the adjustment of the device with all the routines active. The extract is shown as a dotted line and the raffinate as a solid line.

The starting flow rates are:
$Q_1$=16.3 mL/min
$Q_2$=7.6 mL/min
$Q_{mixture}$=0.52 mL/min
$Q_4$=4.82 mL/min
$\Delta T$=1.11 min The flow rates after adjustment are:
$Q_1$=13 mL/min
$Q_2$=7.62 mL/min
$Q_{mixture}$=0.46 mL/min
$Q_4$=5.64 mL/min
$\Delta T$=1.11 min In this example, the feed flow rate at the start is too high to allow extract and raffinate purities at least equal to 99% to be achieved. Thus, for the purities to be correct, the feed flow rate has been reduced. The volume of eluent has also been reduced in this example. The latter corresponds to the difference between the flow rates $Q_1$ and $Q_4$ in zones 1 and 4. As $Q_1$ has reduced and $Q_4$ increased, the flow rate of eluent has reduced. Thus, the volume of eluent used in a cycle has been reduced by 36%.

More generally, all of these routines were tested and have showed their efficiency for initial flow rates and periods conditions making it possible to obtain initial raffinate and extract purities higher than the purity of the mixture to be separated.

EXAMPLE 2

This example illustrates the different stages of the separation process on an SMB-type continuous injection separation device.

The chosen separation is Example 2 of the patent US2002174769.

In this example, the specific variable used corresponds to the sum of the concentrations of each of the compounds circulating in the device (which corresponds for example to the measurement of the density, or to the combination of several absorbances at different UV wavelengths) The characteristic point used is an extremum of the history constituted by the maximum of the signal.

In this example, the separation is that of fructose and glucose over a Dowex 99 monosphere type stationary phase (350 µm) with water at a temperature of 65° C. for separation eluent. In these conditions, the adsorption isotherm is quasi-linear.

The system used has the following characteristics:

| Total number of columns | Number of columns in Zone 1 | Number of columns in Zone 2 | Number of columns in Zone 3 | Number of columns in Zone 4 | Diameter of column | Length of column |
|---|---|---|---|---|---|---|
| 6 | 1 | 2 | 2 | 1 | 2.6 cm | 160 cm |

| C mixture | % fructose | % glucose |
|---|---|---|
| 100 g/L | 50% | 50% |

The considered history is expressed in reduced time, i.e. time divided by cycle time, varying between 0 and 1. The origin of the history corresponds to the moment when the eluent comes close to the observation node.

The target position is fixed at the mixture injection point (i.e. at 0.56 on the x-axis of the history corresponding to the middle of the injection period). The modified parameter is the flow rate in zone 2.

Figure 31:
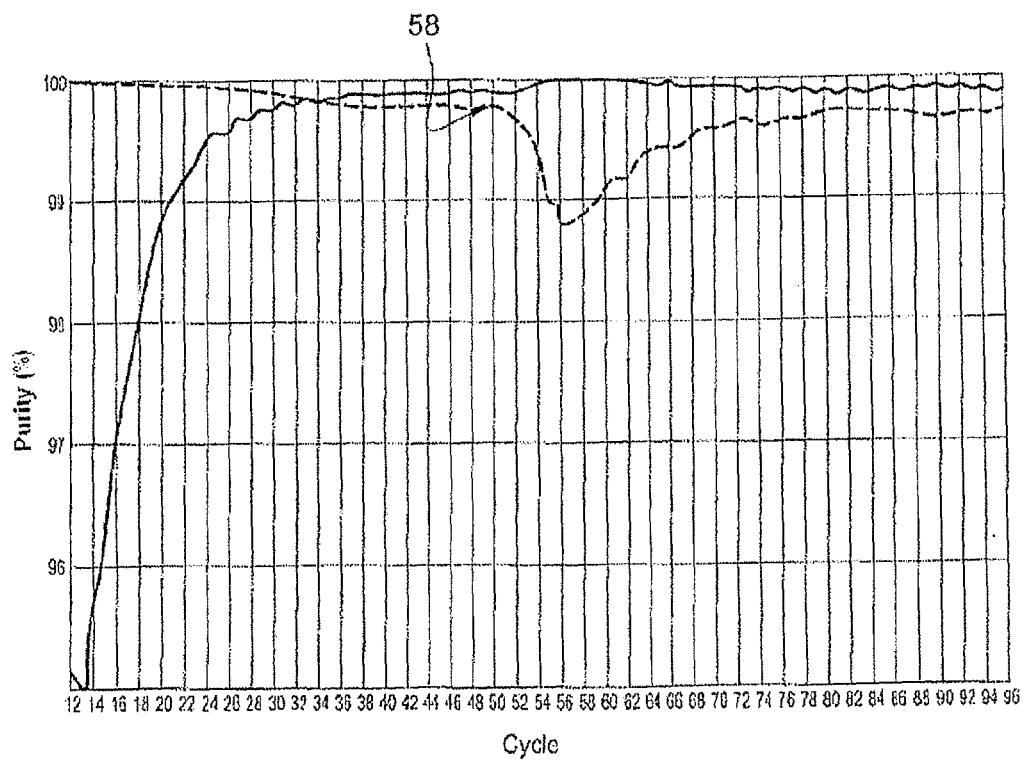

The process starts once the device is stabilized with the starting flow rates, i.e. in cycle 11. Then, after adjustment and stabilization, an average 3.6% variation of the retention time is carried out by increasing the constants of adsorption by a same value. FIG. 31 represents the development in the purities with the adjustment of the device then the variation of the retention (to simulate a disturbance in cycle 50, arrow 58) with the first active routine. The raffinate is shown as a solid line and the extract, as a dotted line. It is seen that the disturbance causes a reduction in the extract purity, but that the process then allows an increase in the extract purity. The position of the characteristic point is adjusted in a fixed target position.

Figure 32:
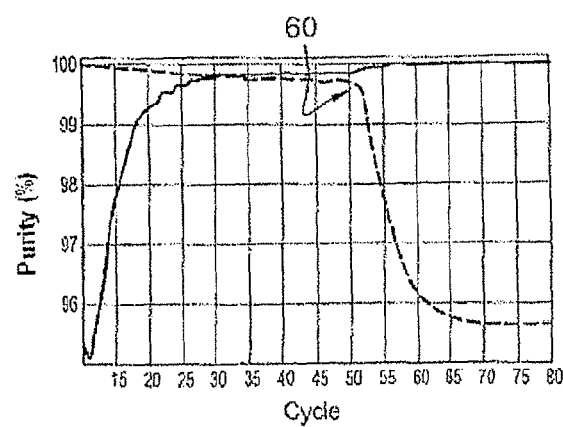

The starting flow rates are:
$Q_1$=115 mL/min
$Q_2$=73 mL/min
$Q_{mixture}$=8 mL/min
$Q_4$=57 mL/min
$\Delta T$=7 min The flow rates after adjustment are:
$Q_1$=115 mL/min
$Q_2$=69.5 mL/min
$Q_{mixture}$=8 mL/min
$Q_4$=57 mL/min
$\Delta T$=7 min The flow rates after disturbance (arrow 58) using the adjustment are:
$Q_1$=115 mL/min
$Q_2$=72.07 mL/min
$Q_{mixture}$=8 mL/min
$Q_4$=57 mL/min
$\Delta T$=7 min FIG. 32 shows a comparison between the development in purities and the adjustment of the device, then the simulation (arrow 60) of variation of the retention in cycle 50 having deactivated the first routine. The raffinate is shown as a solid line and the extract as a dotted line. It is seen that the extract purity reduces as was the case in FIG. 31; however, unlike in FIG. 31, the extract purity drops until it stabilizes at a value below 96%.

It can be seen that the maintenance of a characteristic point on a target position makes it possible to maintain the two purities at a level comparable with the situation prior to the disturbance (FIG. 31); without the first routine, the extract purity remains low (FIG. 32).

During the second routine, the target position of the signal maximum varies in order to adjust the purities to a value at least equal to 99%.

Figure 33:
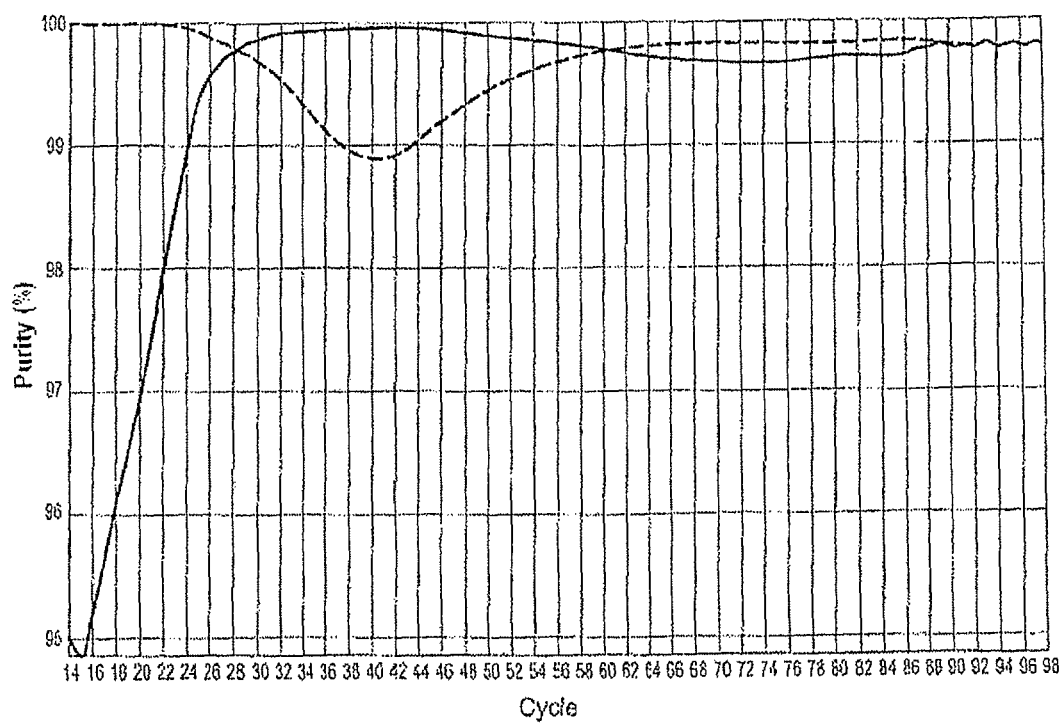

FIG. 33 shows the development in the purities with the positioning of the characteristic point with a target position defined by the second routine. The raffinate is shown as a solid line and the extract as a dotted line.

The starting flow rates are:
$Q_1$=115 mL/min
$Q_2$=73 mL/min
$Q_{mixture}$=8 mL/min
$Q_4$=57 mL/min
$\Delta T$=7 min In this example, the initial flow rate conditions result in a low raffinate purity, which will automatically be compensated and adjusted to produce the following flow rates after adjustment:
$Q_1$=115 mL/min
$Q_2$=69.7 mL/min
$Q_{mixture}$=8 mL/min
$Q_4$=57 mL/min
$\Delta T$=7 min The modification of the target position of the characteristic point takes account of a function dependent on the purities obtained and the target purities.

During the third routine, the flow rate of mixture is optimized in order that the purities are at least equal to 99%.

Figure 34:
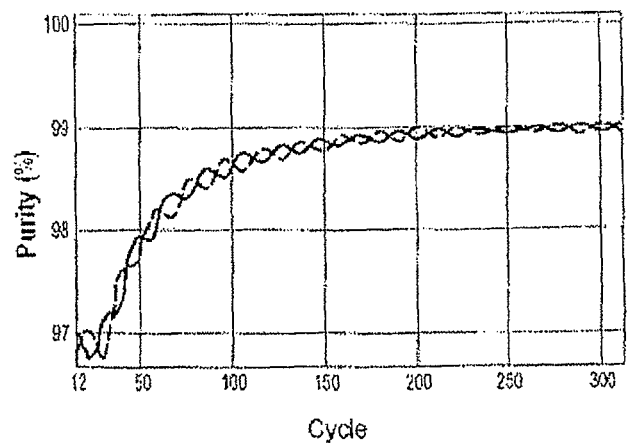

FIG. 34 shows the development in the purities with the positioning of the characteristic point and modification of the quantity of mixture injected. The raffinate is shown as a solid line and the extract as a dotted line.

The starting flow rates are:
$Q_1$=115 mL/min
$Q_2$=67 mL/min
$Q_{mixture}$=13.76 mL/min
$Q_4$=57 mL/min
$\Delta T$=7 min The flow rates after adjustment are:
$Q_1$=115 mL/min
$Q_2$=68.24 mL/min
$Q_{mixture}$=11.21 mL/min
$Q_4$=57 mL/min
$\Delta T$=7 min The modification of the quantity injected is calculated by a function dependent on the purities obtained and the target purities.

Figure 35:
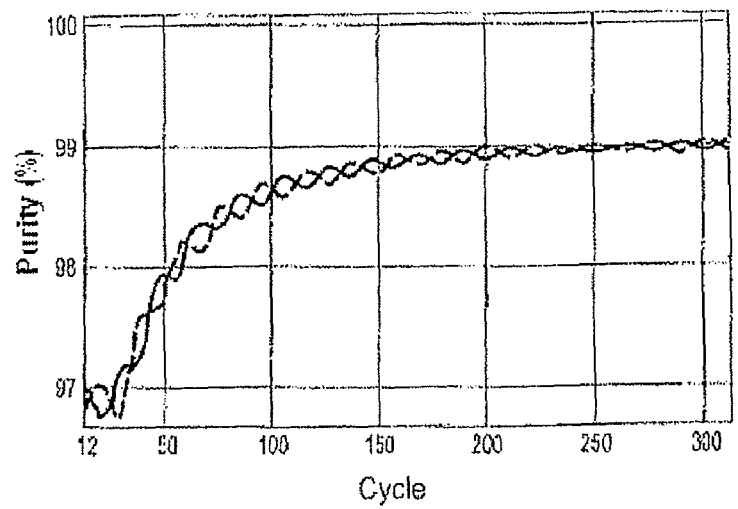

The fourth routine makes it possible to determine the flow rates in zone 1 and 4 and thus to prevent leaks in these same zones. FIG. 35 shows the development in the purities with the process with the four active routines. The raffinate is shown as a solid line and the extract as a dotted line.

The starting flow rates are:
$Q_1$=115 mL/min
$Q_2$=67 mL/min
$Q_{mixture}$=13.76 mL/min
$Q_4$=57 mL/min
$\Delta T$=7 min The flow rates after adjustment are:
$Q_1$=105 mL/min
$Q_2$=68.24 mL/min
$Q_{mixture}$=11.21 mL/min
$Q_4$=59 mL/min
$\Delta T$=7 min During this example, the starting feed flow rate is too high and does not allow satisfactory purities to be obtained. The feed flow rate has been reduced in order that these are at least equal to 99%. Moreover, the fourth routine allowed an adjustment of the volume of eluent. The latter was reduced by 20.7%.

More generally, all of these routines were tested and have showed their efficiency for initial flow rates and periods conditions making it possible to obtain initial raffinate and extract purities higher than the purity of the mixture to be separated.

EXAMPLE 3

This example illustrates the different steps of the separation process on a CycloJet-type discontinuous injection separation device.

In this example, the routines of positioning the characteristic point, defining the target point, modifying the quantity of mixture use the signal of a polarimeter detector as specific variable; the characteristic point used is the point situated between the raffinate and extract collections where the polarimeter signal is zero. The separation molecule is 1,2,3,4-tetrahydro-1-naphthol. The separation eluent is a heptane/IPA/trifluoroacetic acid mixture (95/5/0.2 by volume). The phase used for the separation is a 20 μm Chiralpak AD phase. A model of the separation was determined. It is noted that this does not involve the construction of a model for the adjustment of the process but simply for simulating the device—the adjustment routines being strictly independent.

The publication by O. Ludemann-Hombourger, R. M. Nicoud and M. Bailly in Separation Science and Technology, 35(12), pp 1829-1862, 2000 gives all the parameters necessary for the simulation of the process.

The column length considered in this example is 50 cm for an internal diameter of 1 cm. The flow rate passing through the column throughout the sequence is denoted Qel and is equal to 25 mL/min. The duration of the CycloJet cycle is denoted $\Delta T$. The cycle sequence is expressed as follows: collection of the raffinate between 0 and traf, injection at tinj, extract collection between text and $\Delta T$. The reduced times are then defined: Xraf=traf/$\Delta T$; Xinj=tinj/$\Delta T$, Xext=text/$\Delta T$. In the following examples, Xraf=0.3, Xinj=0.45 and Xext=0.6.

The considered history is expressed in reduced time, i.e. time divided by cycle time, it varies between 0 and 1. The origin of the history corresponds to the start of the sequence of collection of the least retained product.

The first routine consists of positioning the characteristic point in a target position (at the injection point Xinj defined previously and corresponding to 0.45 on the x-axis of the history). This routine does not require knowledge of the purities. In this example, it is the variation of the period of the process that makes this adjustment possible.

Figure 36:
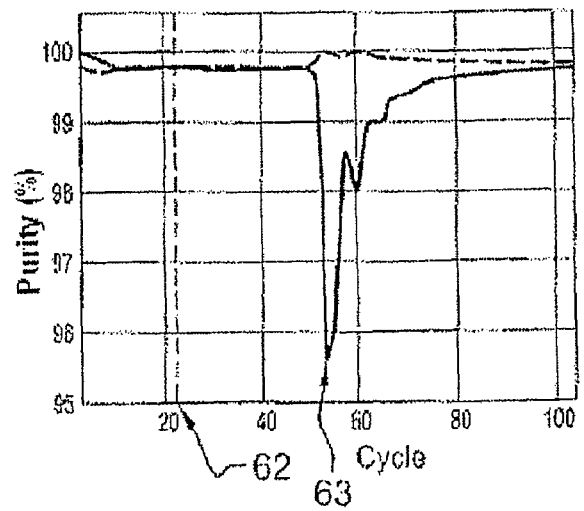

FIG. 36 illustrates the development in the purities with the adjustment with the first routine of the process. The raffinate is shown as a solid line and the extract as a dotted line. The adjustment starts in cycle 21 (arrow 62) after stabilization of the device with the start-up operating parameters. Then, in cycle 50, a −4.8% variation of the retention times of the products is carried out (arrow 63). The starting conditions are:

ΔT=4.178 min
Vinj=1.57 mL

The conditions after adjustment are:
ΔT=3.983 min
Vinj=1.57 mL

The second routine of defining the target position uses extract and raffinate analyses in order to achieve best position of the target position of the first step. The second routine is added to the first routine. The second routine uses the extract and raffinate purities. During this routine, the target position of the characteristic point is calculated such that the purities are at least equal to 99%.

The modification of the target position of the characteristic point takes account of a function dependent on the purities obtained and the target purities.

Figure 37:
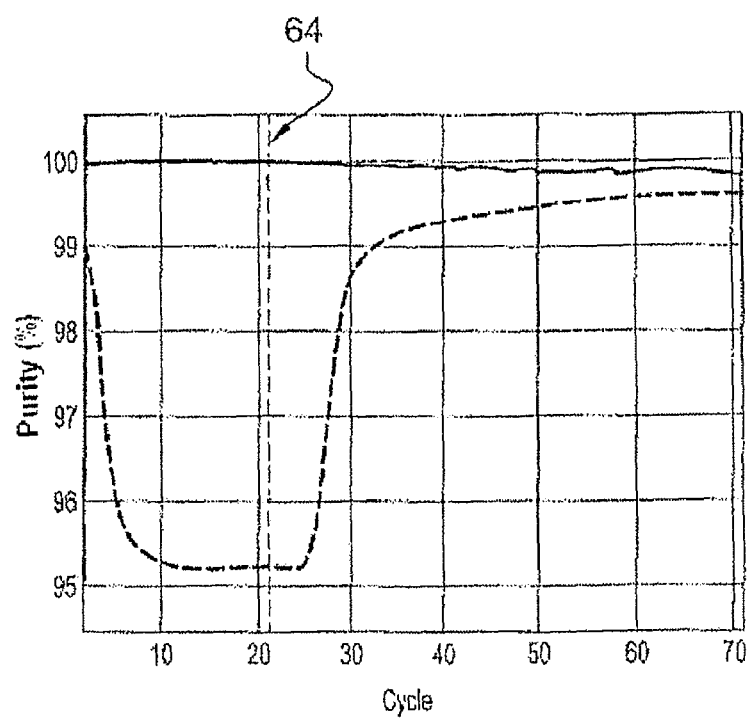

FIG. 37 shows the development in the purities with the process with the first and second active routines. The raffinate is shown as a solid line and the extract as a dotted line. The starting conditions are:

ΔT=4.05 min
Vinj=1.57 mL

The first and second routines of the process are started in cycle 21 (arrow 64), at the time of the adjustment, the position of the target point on the history is equal to 0.517. The conditions after adjustment are:

ΔT=4.17 min
Vinj=1.57 mL

After starting the first and second routines the purities of the two fractions have risen above 99.5% and the position of the characteristic point has been defined at 0.452.

The third routine modifies the quantity of mixture (or feed) injected according to the analyses. It is implemented by knowledge of the extract and raffinate purities. The purities specifications in this case are 99% over both products. Calculation of the target position is carried out in the same way as the second routine.

The calculation of the quantity of feed injected takes place starting from a function dependent on the purities obtained and the target purities.

Figure 38:
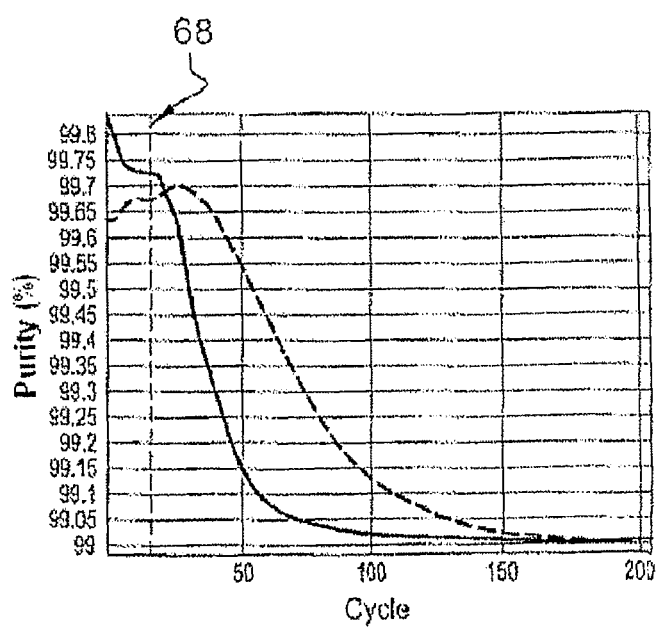

FIG. 38 shows the development in the purities with the process with the first, second and third active routines. The raffinate is shown as a solid line and the extract as a dotted line. The process is started in cycle 25 (arrow 68) The starting conditions are:

ΔT=4.147 min
Vinj=3.96 mL

The conditions after adjustment are:
ΔT=3.968 min
Vinj=4.88 mL

The implementation of the first, second and third routines have allowed a move to a situation where both purities are higher than the target purities, by increasing the injected volume as well as reducing the cycle time, this making it possible to increase by 29% the quantity of mixture processed per unit of time.

The fourth routine makes it possible to adjust the raffinate and extract collections.

In the general case of an accumulation process including a total collection of the most retained product in its sequence, the adjustment of this step is carried out when for example there is a difference between the target position and the position of the characteristic point of the desorption by modifying the duration of the collection stage. It can be noted that the modification of the duration of the collection stage corresponds to the modification of the mobile phase volume associated with the desorption of the most retained product.

In the case of the present CycloJet example, it is considered that the characteristic point of the desorption is designated by a threshold $Y4.1^*$ on the x-axis of the UV signal situated between the start of the extract collection and the end of the eluent injection.

Figure 39:
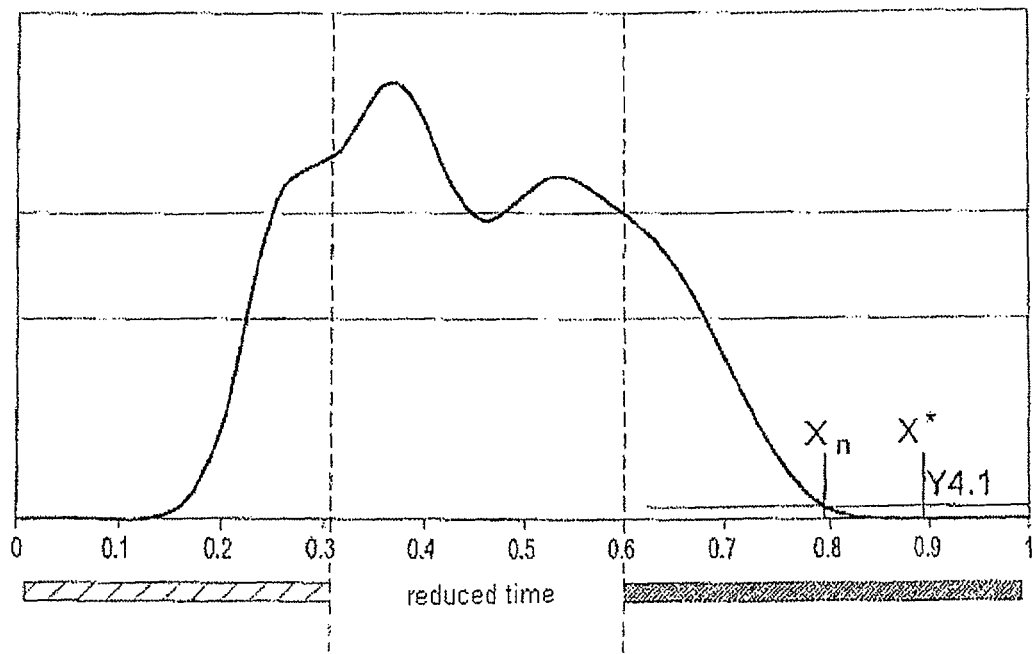

With an extract collection starting from 60% of the period (Xext=0.6) the position of the characteristic point is obtained at Xn=0.8. (FIG. 39)

Figure 40:
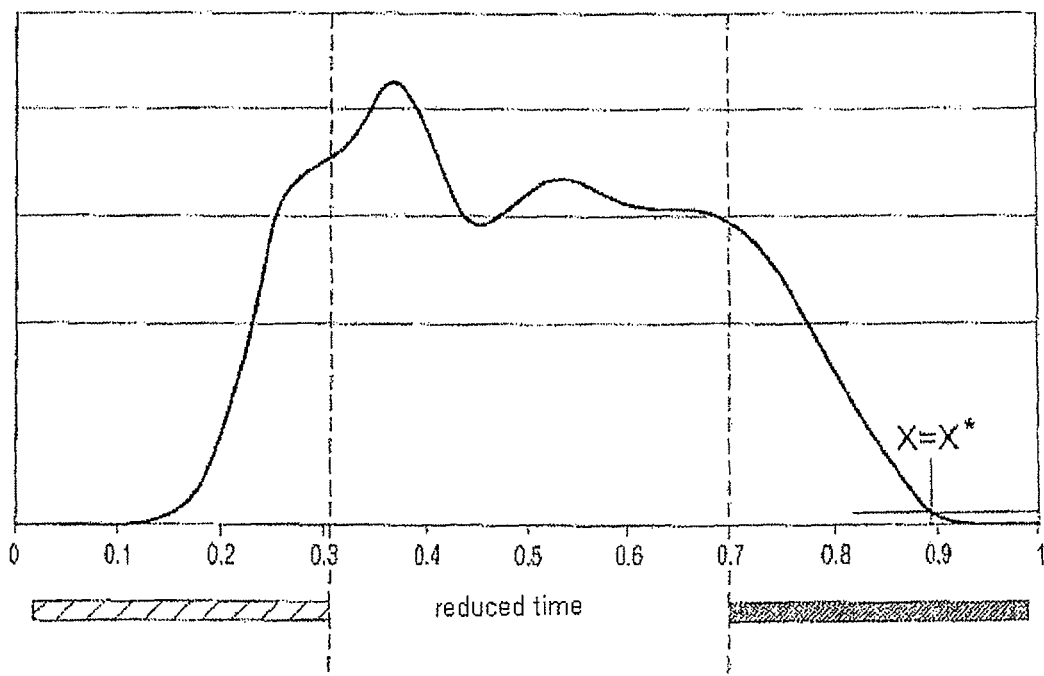

If the target position is defined at $X^*=0.9$, a deviation of 0.1 is observed which can be reduced by modifying the duration of the extract collection step. For example by reflecting this shift on the extract collection starting position. Xext then moves from 0.6 to 0.7 (FIG. 40).

In the general case of an accumulation process including a total collection of the least retained product in its sequence, the adjustment of this step is carried out when for example there is a difference between the target position and the position of the characteristic point of the adsorption by modifying the duration of the collection stage. It can be noted that the modification of the duration of the collection stage corresponds to the modification of the mobile phase volume associated with the collection of the least retained product.

In the case of the present CycloJet example, it is considered that the characteristic point of the adsorption is designated by a threshold $Y4.2^*$ on the UV signal situated between the start of the eluent injection and the end of the raffinate collection.

Figure 41:
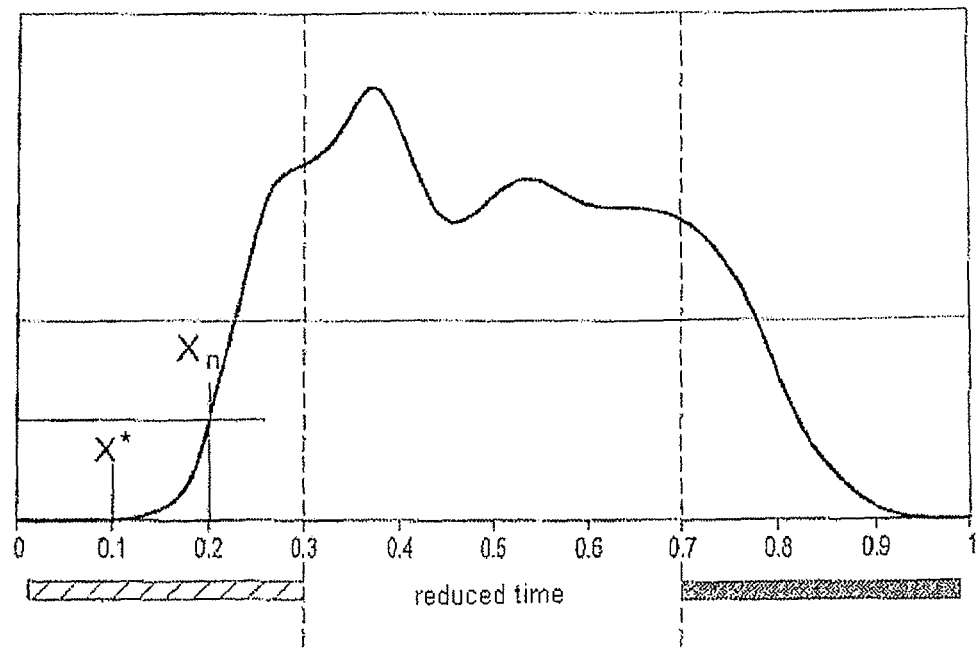

With a raffinate collection ending as from 30% of the period (Xraf=0.3) the position of the characteristic point is obtained at Xn=0.2 (FIG. 41)

Figure 42:
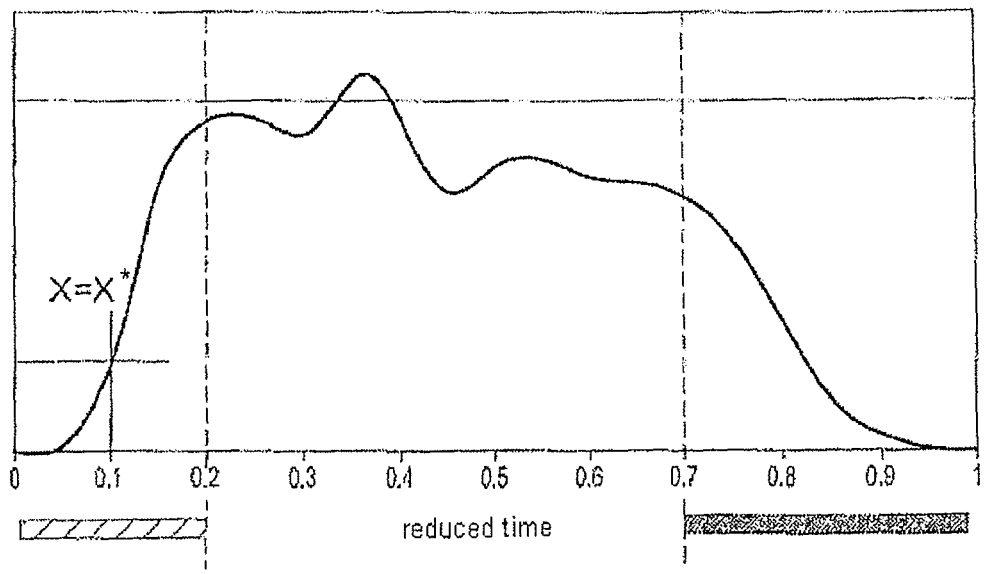

If the target position is defined at $X^*=0.1$, a deviation of −0.1 is observed which can be reduced by modifying the duration of the raffinate collection step. For example this deviation is made good on the extract collection starting position. Xraf then moves from 0.3 to 0.2 (FIG. 42).

When the extract or the raffinate is collected in CycloJet, eluent is injected, reducing the durations of the stages of extract and raffinate collections, and the consumption of eluent has then been reduced.

In this latter case, the fourth routine allowed an adjustment of the quantity of eluent, before adjustment, the eluent was injected for 70% of the cycle sequence, after adjustment the eluent is injected for 50% of the cycle. This is a reduction of 28% in the consumption of eluent.

More generally, all of these routines were tested and have showed their efficiency for initial flow rates and periods conditions making it possible to obtain initial raffinate and extract purities higher than the purity of the mixture to be separated.

EXAMPLE 4

This example illustrates the different stages of the separation process on a continuous-injection separation device of the VariCol type. The chosen separation is that of isomers of the racemic mixture of the tetralone described in WO99/57089—entitled Process for the production of enantiomerically pure or optically high sertralone-tetralone using continuous chromatography.

In this example, the routines of positioning the characteristic point in the separation zone, defining the target point, modifying the quantity of mixture use the signal of a polarimeter detector as a specific variable; the characteristic point used is the point situated between the raffinate and extract collections where the polarimeter signal is zero—it is therefore not necessary to use the invention to carry out a calibration of the detector, since it is not the values of the concentrations which are sought, but a characteristic point of the signal.

The racemic mixture can be separated on a Chiralpak AD (Chiral Technologies Europe) phase with an average particle diameter of 20 μm. The eluent used for the separation is composed of pure acetonitrile. The separation is carried out at the temperature of 25° C.

The experimental device used is a 5-column VariCol having a diameter of 5 cm and a length 11.5 cm. In the case of this separation, the columns are distributed as follows:

| Total number of columns | Average number of columns in Zone 1 | Average number of columns in Zone 2 | Average number of columns in Zone 3 | Average number of columns in Zone 4 |
|---|---|---|---|---|
| 5 | 1 | 1.8 | 1.6 | 0.6 |

In order to carry out 'off line' analyses of extract and raffinate purities products, an analysis device comprising two collection reservoirs, one for the extract, the other for the raffinate, an injection loop and an analytical chromatography chain was used. At regular intervals (every 3 cycles of operation in the case of this example), the extract and raffinate outlet lines are collected during a cycle. For each of the collection reservoirs, after a homogenization stage, a sample of product is taken then injected into the analytical chromatography chain using an injection loop. The analysis time for the extract and raffinate products varies from a period less than one cycle to a period of several cycles depending on the analytical process. The purities values measured during the analyses of each reservoir are sent to the controller.

The feed used is at a concentration of 13 g/L. The aims are to obtain the most retained product, the extract, in a purity of 90% and the least retained product, the raffinate, in a purity of 98.5%.

In this example, the three first monitoring routines are activated, i.e.:
The first routine which consists of positioning a characteristic point of the separation zone in a target position. This first routine does not require precise analysis.
The second routine of defining the target position uses the extract and raffinate lines purities to achieve best positions of the target position of the first step. During this routine, the target position is modified so that the extract and raffinate products purities meet the specified values.
The third routine which modifies the quantity of feed injected is modified according to the precise analyses of the purities so that the extract and raffinate products purities are higher than or equal to the specifications.

In this example, the duration of the analyses of the extract and the raffinate means a delay of 3 cycles vis-à-vis the knowledge of the purities. Thus, the first routine of the adjustment is carried out in every cycle while the precise analyses of the extract and raffinate purities are available every 3 cycles. The actions of steps 2 and 3 are modified as soon as precise purities measurements are available, i.e. every 3 cycles.

For example, extract and raffinate are collected during cycle 10, and analysed for cycles 11 and 12, the purities values are therefore available at the end of cycle 12. In cycle 13, it is possible to modify the action on the set point position of the characteristic point and on the feed flow rate. This action in cycle 13 is based on the purities value of cycle 10. The process is therefore capable of reacting when there is a delay and a spacing of the precise extract and raffinate analyses at the same time.

The adjustment is begun when the unit starts, with the following flow rates:
$Q_1$=253.6 mL/min
$Q_2$=197.9 mL/min
$Q_{mixture}$=8 mL/min
$Q_4$=152.6 mL/min
T=1.4 min Where $Q_1$, $Q_2$, $Q_{mixture}$ and $Q_4$ are respectively the flow rates in zones I, II, the flow rate of mixture to be processed and the flow rate in zone IV, these zones are defined identically for the SMB and VariCol processes and represented in FIG. 1.

These initial flow rates result in a raffinate purity close to 79% and an extract purity of 99%.

Figure 43:
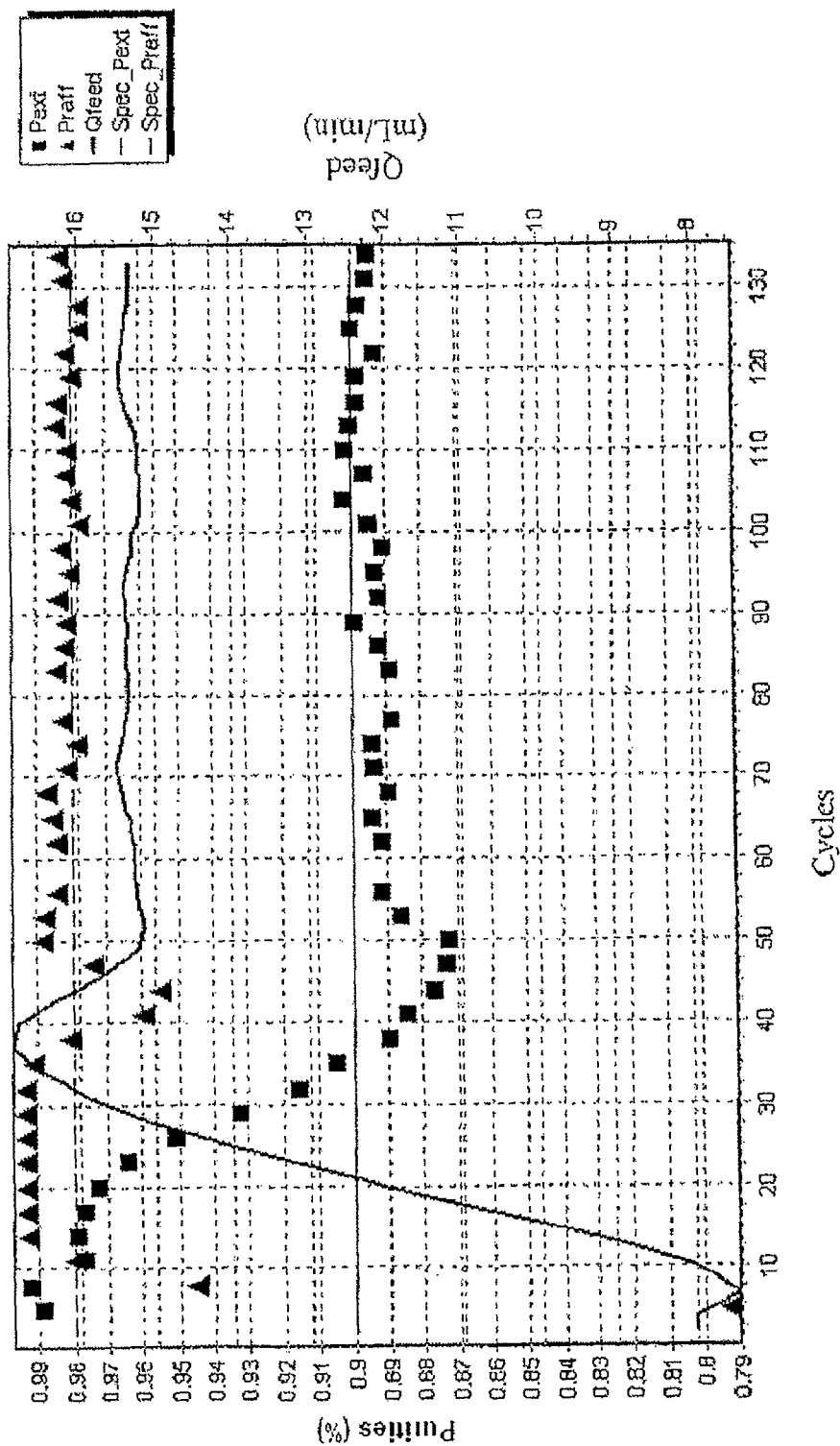
Figure 44:
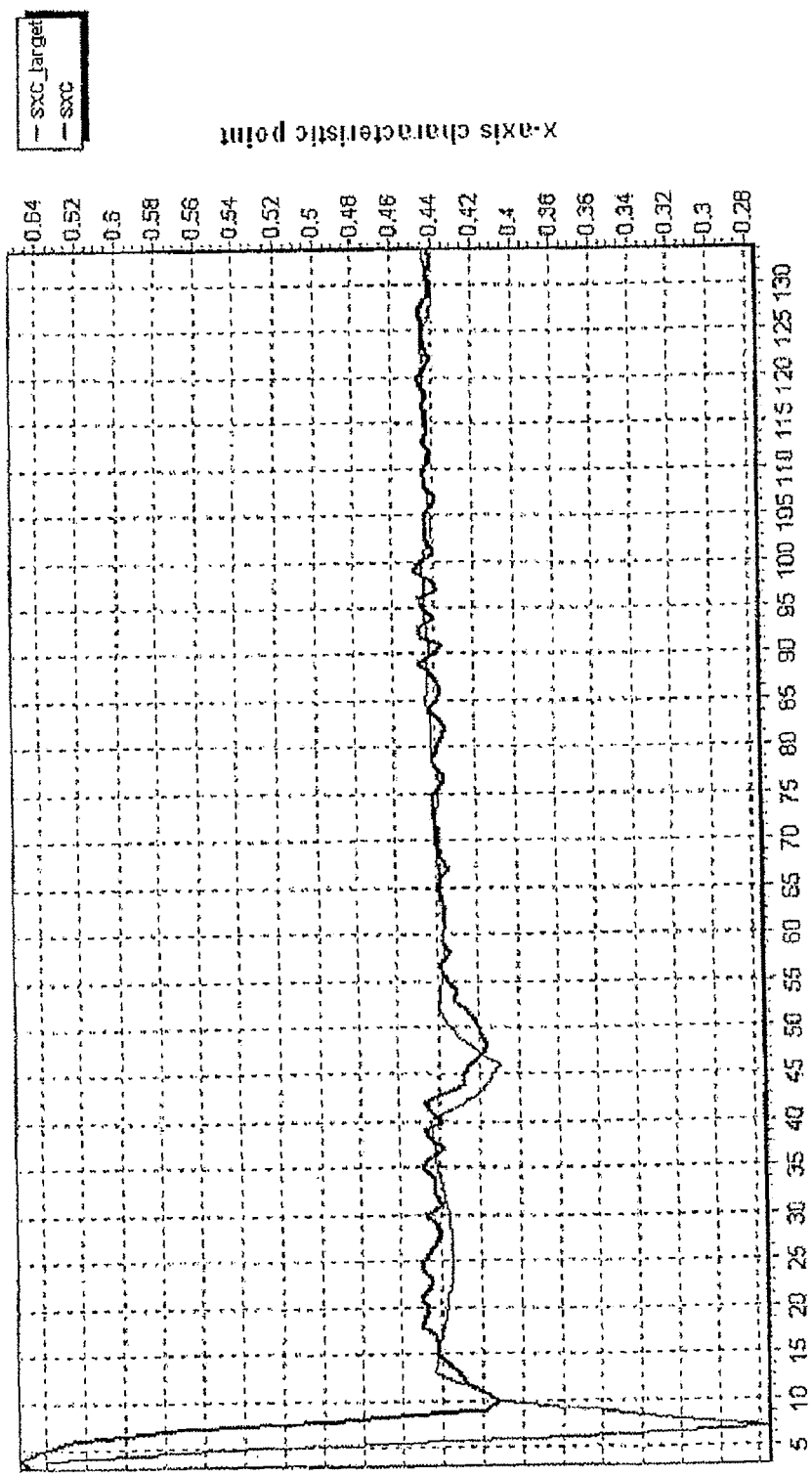

The flow rates after adjustment (i.e. for a raffinate purity of 98%, an extract purity of 90% and an optimized feed flow rate) are:
$Q_1$=253.6 mL/min
$Q_2$=177.5 mL/min
$Q_{mixture}$=15.2 mL/min
$Q_4$=152.6 mL/min
T=1.4 min FIG. 43 represents the development in the purities of extract (squares), raffinate (triangles) and the feed flow rate (bold solid line) during the separation process. FIG. 44 represents the development in the position of the characteristic point (bold solid line) as well as its set point position (fine solid line). In FIG. 43, it is noted that the raffinate purity is rapidly improved and raised above 98%. This action is due to the combined actions of the first and second routines which have distanced the characteristic point from the raffinate line, falling from 0.64 on the x-axis to 0.42 on the x-axis.

In cycle 10, both products exceed the specified purities and the feed flow rate can therefore be increased. In cycle 40, the purities are below the specified values and thus the feed flow rate is re-adjusted using the third routine.

In this example, the raffinate purity is substantially degraded at the start-up of the unit and is raised to the specified values in approximately 10 cycles. The extract purity is adjusted to 90% in approximately forty cycles. The feed flow rate is adjusted (increasing from 8 mL/min to 15.2 mL/min) in approximately sixty cycles.

EXAMPLE 5

This example illustrates the different stages of the separation process on an SMB continuous-injection separation device.

The chosen separation is the example of patent US2002174769.

In this example, the specific variable used by the first routine corresponds to the difference in the concentrations of each of the compounds moving in the device, the associated characteristic point is the cancellation of the signal in the separation zone. The specific variable used by the fourth routine is the sum of the concentrations, the associated characteristic points are relative thresholds. In this example, the specific variables and the associated characteristic points do not require precise measurement of concentrations, which means that there is no need for calibration of the detectors giving the specific variables.

In this example, the separation is that of fructose and glucose over a Dowex 99 monosphere type (350 µm) stationary phase having water at a temperature of 65° C. for separation eluent. In these conditions, the adsorption isotherm is quasi-linear.

The system used has the following characteristics:

| Total number of columns | Average number of columns in Zone 1 | Average number of columns in Zone 2 | Average number of columns in Zone 3 | Average number of columns in Zone 4 | Diameter of column | Length of column |
|---|---|---|---|---|---|---|
| 6 | 1 | 2 | 2 | 1 | 2.6 cm | 160 cm |

| C mixture | % fructose | % glucose |
|---|---|---|
| 100 g/L | 50% | 50% |

In this example, the four monitoring routines are activated, i.e.:

The first routine which consists of positioning a characteristic point of the separation zone in a target position. This first routine does not require precise analysis.

The second routine of defining the target position uses the extract and raffinate lines purities to achieve best positions of the target position of the first step. During this routine, the target position is modified so that the extract and raffinate products purities correspond to the specified values.

The third routine which modifies the quantity of feed injected is modified according to the precise analyses of the purities so that the extract and raffinate products purities are higher than or equal to the specified values.

The fourth routine which consists of positioning the characteristic points of each of the zones I and IV in a target position. It allows these same zones to be adjusted, the result being the modification of the eluent flow rate.

The characteristic point in zone I must be situated on a defined target x-axis in the middle of zone I and the chosen threshold value is determined at 1% of the maximum of the UV signal. The same applies in zone IV for a target x-axis situated in zone IV. The threshold value therefore floats according to the maximum and minimum values of the specific variable corresponding to the sum of the two concentrations.

The purities are calculated by an averaging of the extract and raffinate compositions over one cycle. In this numerical example, a delay time of 3 cycles in respect of knowledge of the purities has been added.

The adjustment is begun when the unit starts, with the following flow rates:
$Q_1$=115 mL/min
$Q_2$=67 mL/min
$Q_{mixture}$=13.76 mL/min
$Q_4$=57 mL/min
T=7 min
Where $Q_1$, $Q_2$, $Q_{mixture}$ and $Q_4$ are respectively the flow rates in the zones I, II, the flow rate of mixture to be processed and the flow rate in zone IV, these zones are defined identically for the SMB and VariCol processes and represented in FIG. 1.

These flow rates result in a raffinate purity close to 97% and an extract purity of 97%.

Figure 45:
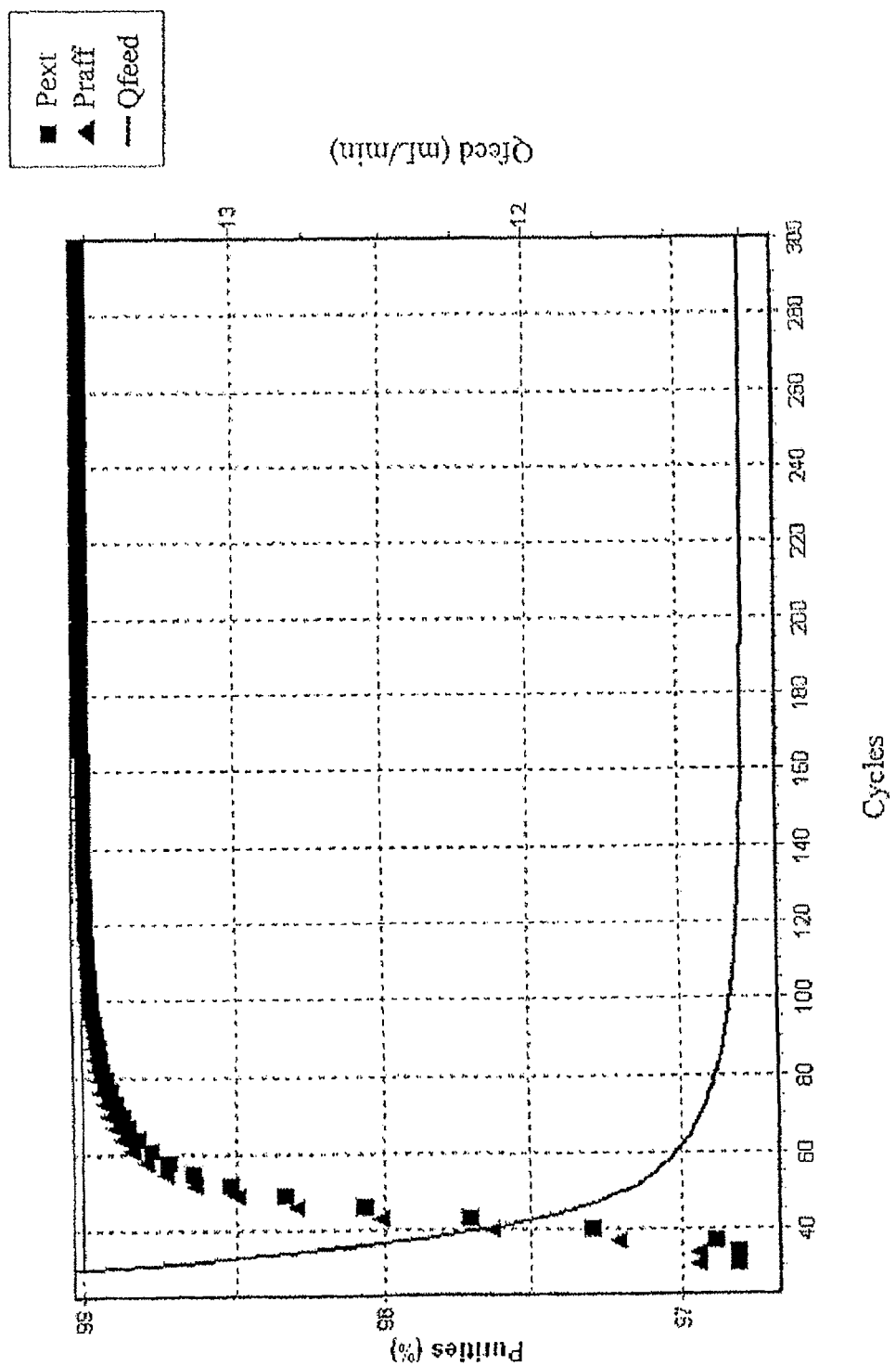
Figure 46:
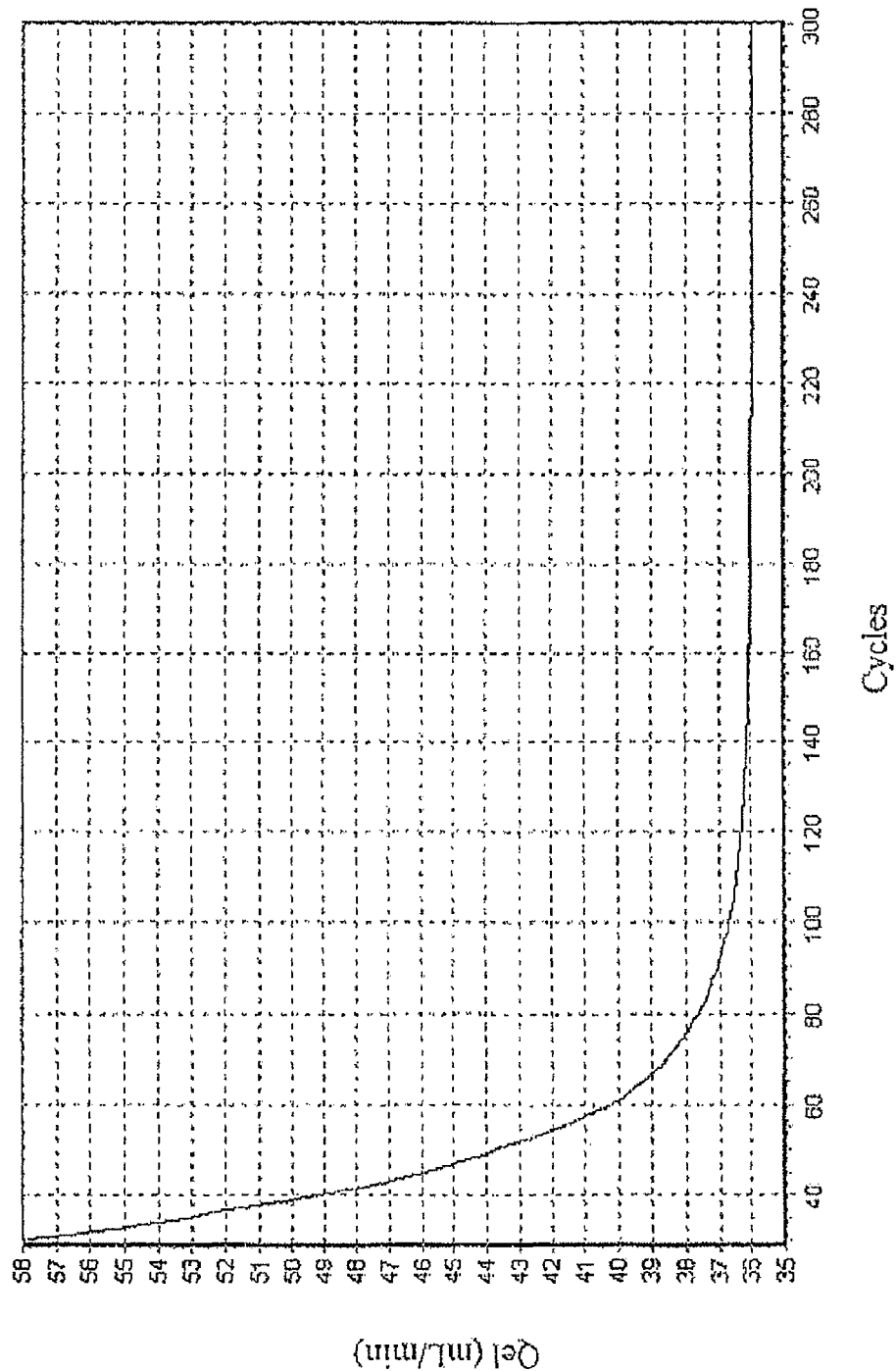

The flow rates after adjustment (i.e. for a raffinate purity of 99%, an extract purity of 99% and optimized flow rates of feed and eluent) are:
$Q_1$=94.2 mL/min
$Q_2$=68.2 mL/min
$Q_{mixture}$=11.25 mL/min
$Q_4$=58.2 mL/min
T=1.4 min FIG. 45 represents the development in the purities of extract (square), raffinate (triangle) and the feed flow rate (bold solid line) during the separation process. FIG. 46 represents the development in the flow rate of eluent during the separation.

During this example, the starting feed flow rate is too high and does not allow satisfactory purities to be obtained. The feed flow rate has been reduced in order that these are at least equal to 99%. A good adjustment is observed in spite of a delay of 3 cycles in respect of the knowledge of the purities. Moreover, the latter is just as rapid as when there are no delay cycles (cf FIG. 35).

The fourth routine allowed an adjustment of the volume of eluent, reducing it by 37.9%.

EXAMPLE 6

This example illustrates the effect of the first monitoring routine on a discontinuous injection separation process of the type described in application FR 2 889 077.

In this example, the routine of positioning the characteristic point uses the signal of a polarimeter detector as specific variable; the characteristic point used is the point situated between the raffinate and extract collections where the polarimeter signal is zero.

The separation molecule is 1.2,3,4-tetrahydro-1-naphthol. The separation eluent is a heptane/IPA/trifluoroacetic acid mixture (95/5/0.2 by volume). The phase used for the separation is a 20 µm Chiralpak AD phase. A model of the separation was determined in order to simulate the device.

The publication by O. Ludemann-Hombourger, R. M. Nicoud and M. Bailly in Separation Science and Technology, 35 (12), pp 1829-1862, 2000 gives all the parameters necessary for the simulation of the process.

The variables used for the simulation are:
2 columns with an internal diameter of 1 cm and length of 20 cm;
the temperature is 25° C.;
eluent flow rate of 22 mL/min, except when the feed is injected, when the eluent flow rate is zero;
a feed composed of racemic dissolved in the eluent at a concentration of 20 g/L; this feed is injected at a flow rate of 15.7 mL/min for 0.1 min at the start of each period, at the inlet of the second column during the first period and at the inlet of the first column during the second period.
The period is ΔT, the duration of the cycle is two periods i.e. 2.ΔT.

Figure 47:
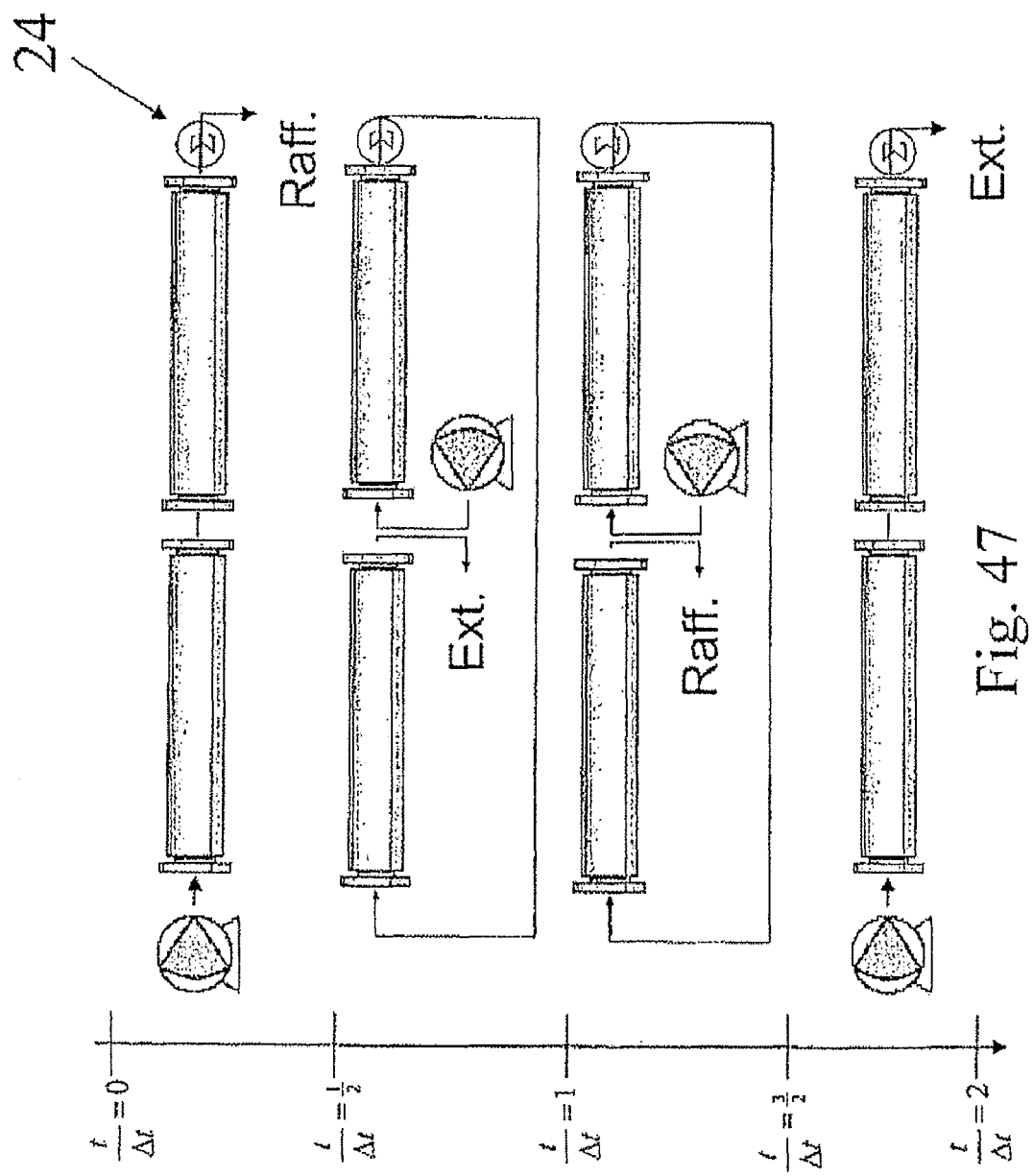

The sequence of FIG. 47 is simulated, repeated cyclically.
In this example, only the first routine is activated. The detector used at the observation node 24 is situated at the outlet of the second column, corresponding to a polarimeter sending a specific variable representing the difference between the two concentrations. The characteristic point 28 is the point of the separation zone where the signal is zero. The first routine consists of positioning the characteristic point 28 in a target position 32, for example 0.9 on the x-axis. This routine does not require knowledge of the purities.

Figure 48:
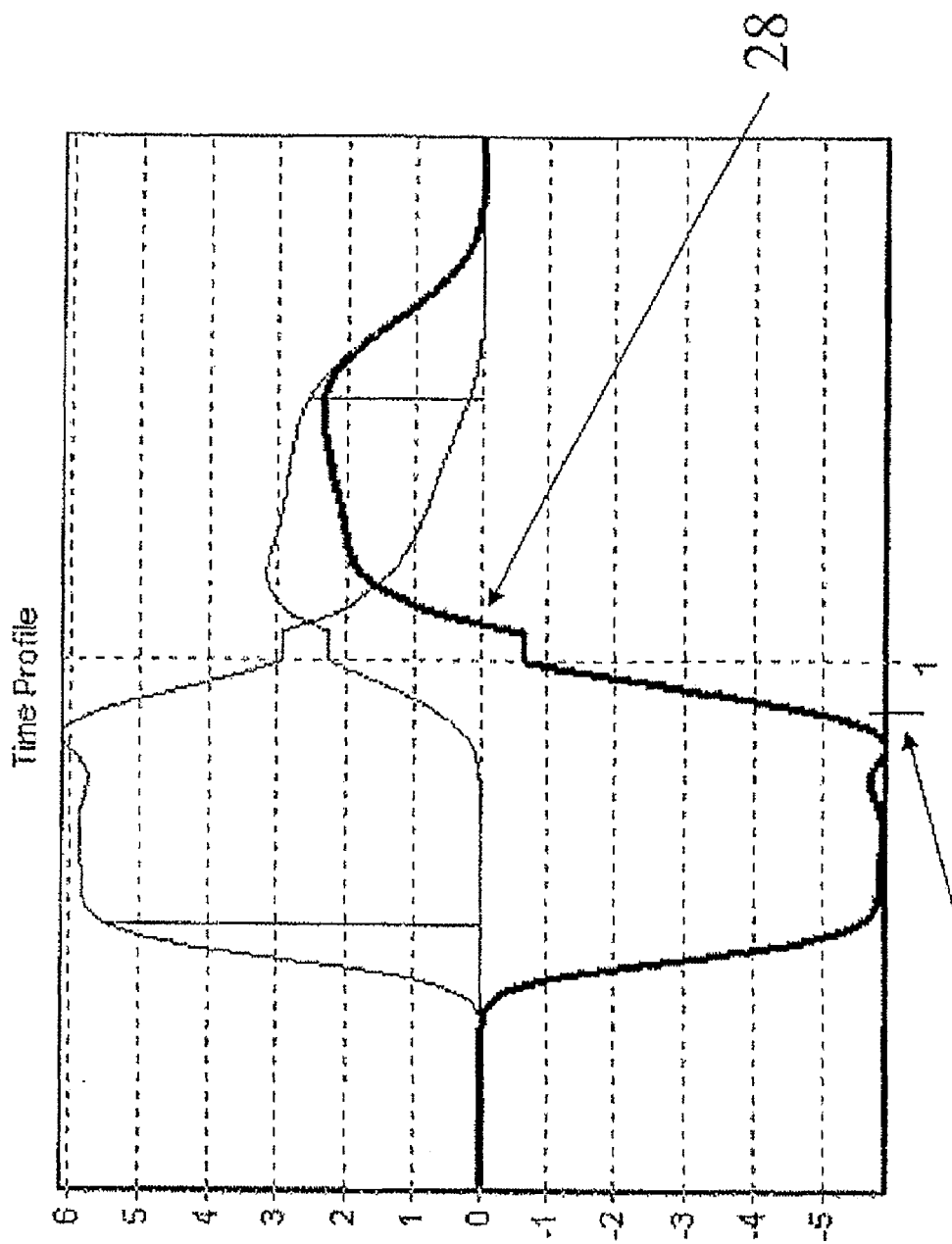
Figure 49:
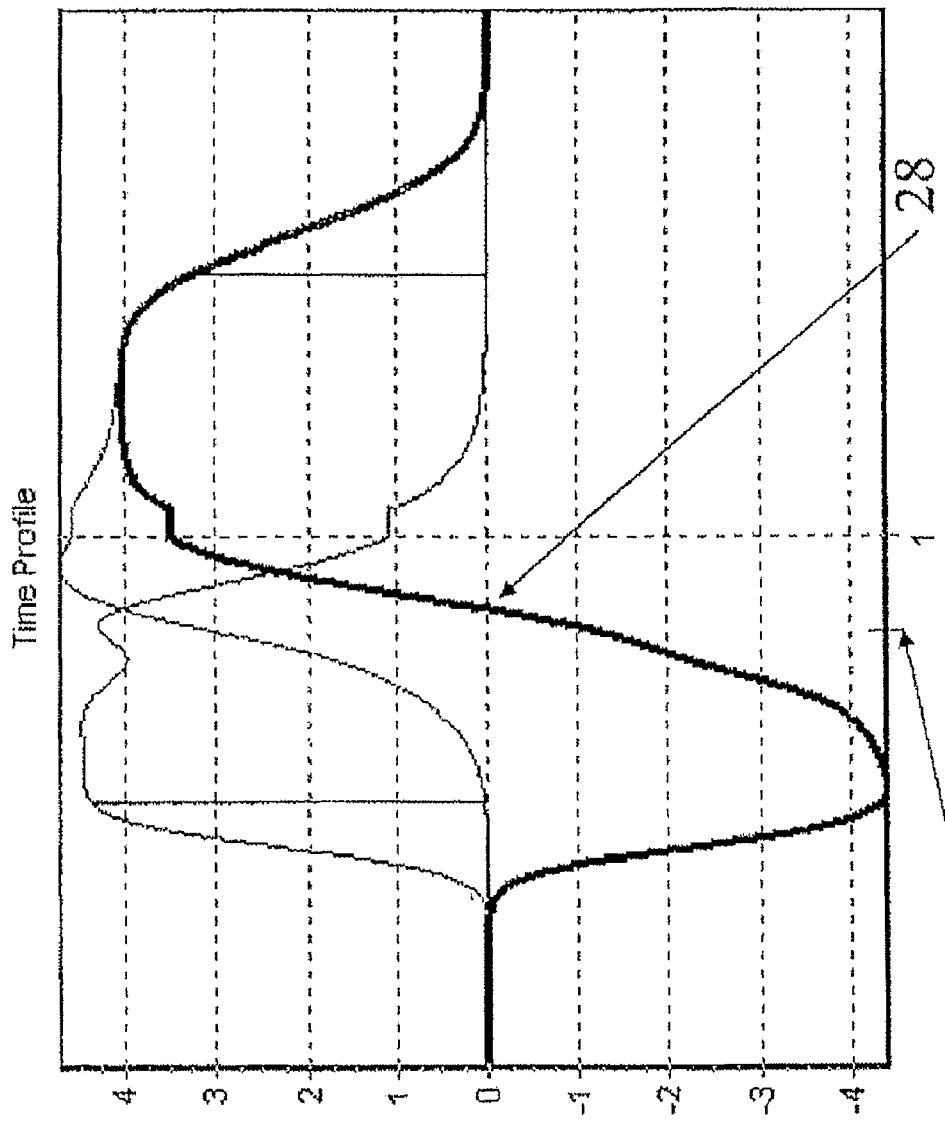

FIGS. 48 and 49 show respectively the polarimeter signal as a bold line at the start-up of the unit and after adjustment.

The starting conditions are: $\Delta T=1.76$ min, the position of the characteristic point 28 in FIG. 48 is greater than 1, which implies a "delay" that the first routine will correct by increasing mobile phase volume making it possible to shift the characteristic point over a cycle. In this example, it is the variation of the period of the process that makes this adjustment possible: at a constant flow rate, the result of increasing mobile phase volume making it possible to shift the characteristic point over one cycle is an increase of the period. In FIG. 49, the characteristic point 28 is at point 32 (for example 0.9).

The conditions after adjustment, i.e. positioning of the characteristic point at 0.9 on the x-axis, are: $\Delta T=1.82$ min.

This example illustrates the advantage of the first routine. An adjustment of a characteristic point in a target position does not demand strict calibration or precise measuring of purity, and can take place from one cycle to the next. The optimum target position can thus be defined by the user of the process or automatically by adding a device for measuring the purities of the collections for example averaged over a cycle and using routines 2 and 3 of the invention.

The examples illustrate that the invention can be applied to continuous or discontinuous processes, by monitoring mobile phase volume which makes it possible to position a characteristic point, while modifying the fluid flow rate, or by changing the period during which a flow rate of mobile phase is applied in the system, a combination of both approaches naturally being possible.

A multi-column SSMB-type process is composed of a set of periods (time period separating the shifting of the eluent, feed, extract and raffinate lines). Each of these periods is a set of sub-sequences. The modification of the mobile phase volume making it possible to position a characteristic point can then take place by modifying the flow rate or by changing the period of application of the flow rate over the period of one or more of the sequences which make up the period.

EXAMPLE 7

This example illustrates a characteristic point which can be used in the applicable separation zone preferentially on a CycloJet process or on a process similar to the process of Example 6.

Figure 50:
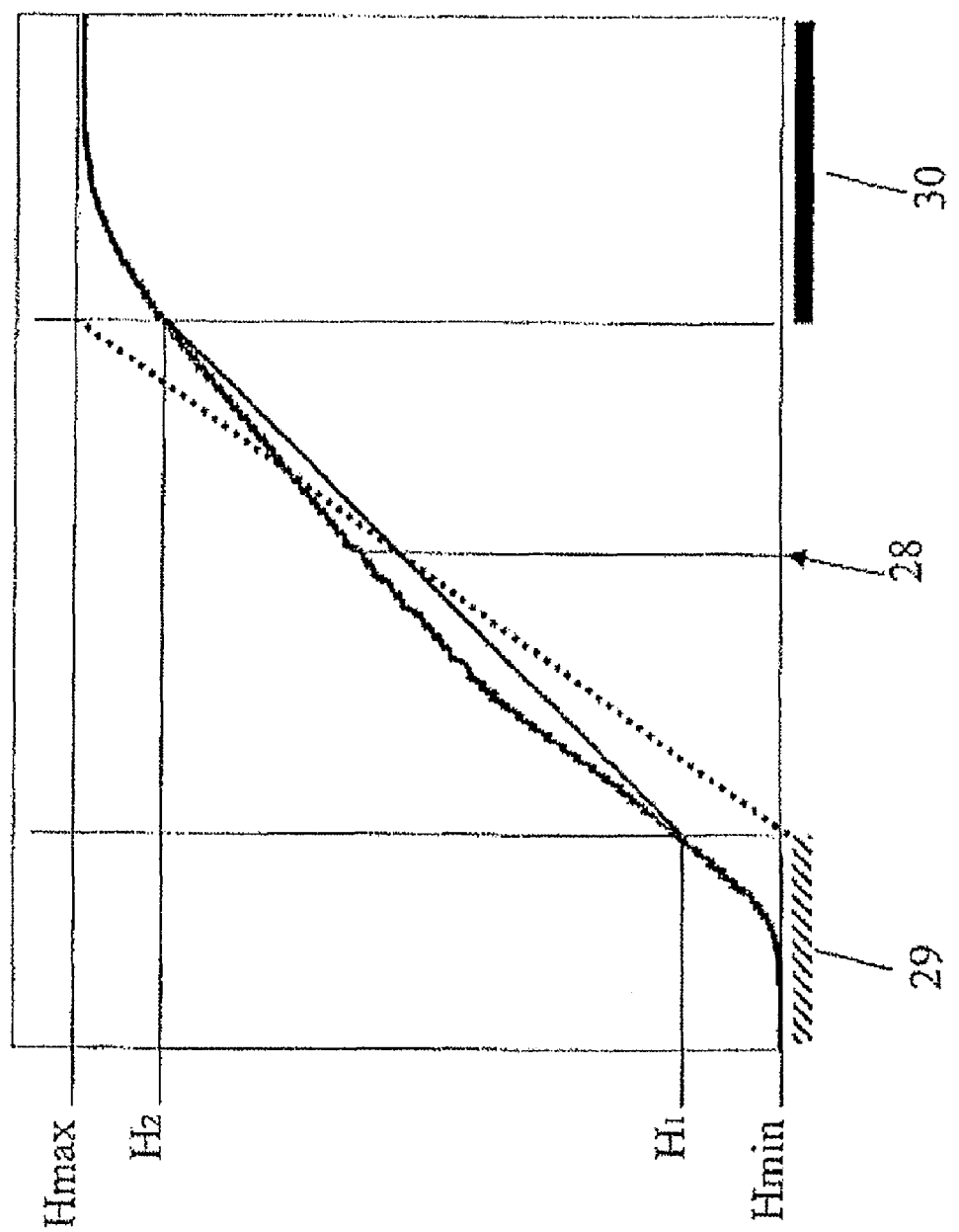

FIG. 19 shows a signal history from a UV detector that can be obtained on a CycloJet process. FIG. 50 shows the integration over time of the signal furnished by the UV detector shown in FIG. 19—in a bold grey line (not straight).

FIG. 50 shows a UV signal integrated over time on a Cyclojet process history.

The signal of FIG. 50 has minimum and maximum heights Hmin and Hmax at the start and end of the cycle. At the end of collection 29, the height is $H_1$ and at the start of collection 30, the height of the signal is $H_2$.

A first straight dotted line is plotted between:
an end-of-collection x-axis 29 and height Hmin
a start-of-collection x-axis point 30 and height Hmax
A second straight solid line is plotted between:
an end-of-collection x-axis 29 and height $H_1$
a start-of-collection x-axis 30 and height $H_2$ The intersection of the two straight lines thus obtained is a characteristic point, the x-axis or position of which can be adjusted according to the invention.

In this example, it is not necessary to know precisely the concentrations of the species, which the UV detector does not allow. It is therefore possible to consider the signal in itself as specific variable but also a transformation of this signal such as for example an integration.

The invention claimed is:

1. Process for separating a fraction of a mixture in a discontinuous chromatography device having
one or more columns in a loop, a circulating mobile phase shifting the fractions of the mixture to be separated in said loop,
injection points for mixture and eluent,
fractions collection points,
sequencing elements for injection and collection points,
the process comprising steps of collecting the fractions, injecting the mixture between two successive collections in the period where the fractions of the mixture leave the column(s) and are sent to the next inlet;
wherein the process further comprises the steps of:
at a node of the device, monitoring the history of a specific variable of the fractions of the mixture to be separated,
detection of a characteristic point of the history, the characteristic point being between two successive fraction collection steps,
comparison of the position of the characteristic point with a target position,
adjustment of the quantity of the mobile phase modifying the position of the characteristic point in order to make the position of the characteristic point coincide with the target position.

2. The process according to claim 1, wherein monitoring of the history is carried out at a single node.

3. The process according to claim 1, further comprising the steps of:
measuring the purity of at least one collected fraction,
comparing of the measured purity with a predetermined purity,
wherein the process further comprises a step of defining the target point according to the difference between the measured purity and the predetermined purity.

4. The process according to claim 1, further comprising the steps of
measuring the purity of at least two collected fractions,
comparing the measured purity of the fractions with respectively a predetermined purity,
wherein the process further comprises a step of defining the target position according to the difference between the measured purities and the predetermined purities.

5. The process according to claim 1, wherein during the step of defining the target position, the target position is defined following modification of the position of the mixture injection on the history.

6. The process according to claim 1, also comprising the steps of:
measuring the purity of at least one collected fraction,
comparing the measured purity with a predetermined purity,
wherein the process further comprises a step of modifying the quantity of mixture injected according to the difference between the measured purity and the predetermined purity.

7. The process according to claim 1, also comprising the steps of
measuring the purity of at least two collected fractions,
comparing the measured purity of the fractions with respectively a predetermined purity, wherein the process further comprises a step of modifying the quantity of mixture injected according to the difference between the measured purities and the predetermined purities.

8. The process according to claim 1, wherein it also comprises steps of in a node of the device, monitoring the history of a specific variable of the fractions of the mixture to be separated, detecting a second characteristic point of the history, dedicated to the adsorption or the collection of a fraction of the less retained mixture, situated between the step of drawing-off or collecting of less retained fraction and the eluent-injection step;

comparing the position of the characteristic point according to a target position, adjusting the quantity of the mobile phase modifying the position of the characteristic point in order to make the position of the characteristic point coincide with the target position.

9. The process according to claim 8, wherein the device comprises a zone at the inlet of which a less retained fraction is drawn off and at the outlet of which eluent is injected, the process comprising, at the adjustment step, the adjustment of the average flow rate in this zone in order to make the position of the characteristic point coincide with the target position.

10. The process according to claim 8, wherein, during the adjustment step, the cycle time is modified in order to make the position of the characteristic point coincide with the target position.

11. The process according to claim 1, wherein it also comprises steps of in a node of the device, monitoring the history of a specific variable of the fractions of the mixture to be separated, detecting a third characteristic point of the history, dedicated to the desorption or the collection of a more retained fraction of the mixture, situated between the eluent-injection step and the step of collecting or drawing-off more retained fraction;

comparing the position of the characteristic point according to a target position;

adjustment of the quantity of the mobile phase modifying the position of the characteristic point in order to make the position of the characteristic point coincide with the target position.

12. The process according to claim 11, wherein the device comprises a zone at the inlet of which eluent is injected and at the outlet of which a more retained fraction is drawn off, wherein the process comprises, at the adjustment step, the adjustment of the average flow rate in this zone in order to make the position of the characteristic point coincide with the target position.

13. The process according to claim 11, wherein, during the adjustment step, the cycle time is modified in order to make the position of the characteristic point coincide with the target position.

14. The process according to claim 1, wherein the characteristic point is chosen from the group consisting of an inflexion point of the history, a threshold of the history, an extremum of the history, a zero value, a defined slope of the history.

15. The process according to claim 1, wherein the specific variable is chosen from the group consisting of rotatory power, adsorption of spectroscopic radiation, emission of spectroscopic radiation, density, refractive index, conductivity, pH.

16. The process according to claim 1, wherein the device comprises several columns connected in series and the chromatographic device is suitable for the VariCol process, or the simulated moving bed process.

* * * * *